(12) United States Patent  
Killalea et al.

(10) Patent No.: US 9,087,032 B1  
(45) Date of Patent: Jul. 21, 2015

(54) AGGREGATION OF HIGHLIGHTS

(75) Inventors: Tom Killalea, Seattle, WA (US);
Thomas Dimson, King City (CA);
Janna Hamaker, Issaquah, WA (US);
Eugene Kalenkovich, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 558 days.

(21) Appl. No.: 12/360,089

(22) Filed: Jan. 26, 2009

(51) Int. Cl.
*G06F 17/00* (2006.01)
*G06F 17/24* (2006.01)
*G06F 17/22* (2006.01)

(52) U.S. Cl.
CPC .......... *G06F 17/241* (2013.01); *G06F 17/2241* (2013.01)

(58) Field of Classification Search
None
See application file for complete search history.

(56) References Cited

U.S. PATENT DOCUMENTS

| | | |
|---|---|---|
| 2,684,955 A | 9/1954 | Knowles |
| 4,622,627 A | 11/1986 | Rodriguez et al. |
| 4,985,697 A | 1/1991 | Boulton |
| 5,418,549 A | 5/1995 | Anderson et al. |
| 5,495,268 A | 2/1996 | Pearson et al. |
| 5,499,359 A | 3/1996 | Vijaykumar |
| 5,517,407 A | 5/1996 | Weiner |
| 5,544,305 A | 8/1996 | Ohmaye et al. |
| 5,566,098 A | 10/1996 | Lucente et al. |
| 5,600,775 A | 2/1997 | King et al. |
| 5,623,260 A | 4/1997 | Jones |
| 5,630,159 A | 5/1997 | Zancho |
| 5,640,553 A | 6/1997 | Schultz |
| 5,659,742 A | 8/1997 | Beattie et al. |
| 5,661,635 A | 8/1997 | Huffman et al. |
| 5,663,748 A | 9/1997 | Huffman et al. |
| 5,696,982 A | 12/1997 | Tanigawa et al. |
| 5,710,922 A | 1/1998 | Alley et al. |
| 5,711,922 A | 1/1998 | O'Brien et al. |
| 5,742,905 A | 4/1998 | Pepe et al. |
| 5,761,485 A | 6/1998 | Munyan |
| 5,765,168 A | 6/1998 | Burrows |
| 5,774,109 A | 6/1998 | Winksy et al. |
| 5,813,017 A | 9/1998 | Morris |
| 5,845,278 A | 12/1998 | Kirsch et al. |

(Continued)

FOREIGN PATENT DOCUMENTS

| | | |
|---|---|---|
| CN | 1362682 | 8/2002 |
| CN | 1841373 | 10/2006 |

(Continued)

OTHER PUBLICATIONS

Cafesoft.com, "Security Glossary", dated Oct. 13, 2003, retrieved from the Wayback Machine on Jul. 2, 2009 at <<http://web.archive.org/web/20031013022218/http://cafesoft.com/support/security-glossary.html>>.

(Continued)

*Primary Examiner* — Stephen Hong
*Assistant Examiner* — Keith Bloomquist
(74) *Attorney, Agent, or Firm* — Lee & Hayes, PLLC

(57) ABSTRACT

Highlights from a community of users highlighting portions of an electronic digital work may produce aggregated highlights. Users may have access to public and purchase versions of the aggregated highlights. Reconciliation of highlights across multiple versions of the same digital work may also take place, with the reconciled highlights incorporated into the aggregated highlights.

27 Claims, 18 Drawing Sheets

(56) References Cited

U.S. PATENT DOCUMENTS

| | | |
|---|---|---|
| 5,845,301 A | 12/1998 | Rivette et al. |
| 5,847,698 A | 12/1998 | Reavey et al. |
| 5,892,900 A | 4/1999 | Ginter et al. |
| 5,923,861 A | 7/1999 | Bertram et al. |
| 5,930,026 A | 7/1999 | Jacobson et al. |
| 5,940,846 A | 8/1999 | Akiyama |
| 5,956,048 A | 9/1999 | Gaston |
| 5,960,411 A | 9/1999 | Hartman et al. |
| 5,973,681 A | 10/1999 | Tanigawa et al. |
| 5,991,439 A | 11/1999 | Tanaka et al. |
| 6,018,575 A | 1/2000 | Gross et al. |
| 6,034,839 A | 3/2000 | Hamming |
| 6,037,954 A | 3/2000 | McMahon |
| 6,041,335 A | 3/2000 | Merritt et al. |
| 6,047,189 A | 4/2000 | Yun et al. |
| 6,049,334 A | 4/2000 | Bates et al. |
| 6,049,796 A | 4/2000 | Siitonen et al. |
| 6,064,980 A | 5/2000 | Jacobi et al. |
| 6,073,148 A | 6/2000 | Rowe et al. |
| 6,113,394 A | 9/2000 | Edgar |
| 6,148,340 A | 11/2000 | Bittinger et al. |
| 6,154,757 A | 11/2000 | Krause et al. |
| 6,164,974 A | 12/2000 | Carlile et al. |
| 6,195,698 B1 | 2/2001 | Lillibridge et al. |
| 6,201,771 B1 | 3/2001 | Otsuka et al. |
| 6,226,642 B1 | 5/2001 | Beranek et al. |
| 6,233,318 B1 | 5/2001 | Picard et al. |
| 6,272,461 B1 | 8/2001 | Meredith et al. |
| 6,300,947 B1 | 10/2001 | Kanevsky |
| 6,308,320 B1 | 10/2001 | Burch |
| 6,313,828 B1 | 11/2001 | Chombo |
| 6,331,866 B1 | 12/2001 | Eisenberg |
| 6,331,867 B1 | 12/2001 | Eberhard et al. |
| 6,335,678 B1 | 1/2002 | Heutschi |
| 6,351,750 B1 | 2/2002 | Duga et al. |
| 6,385,596 B1 | 5/2002 | Wiser et al. |
| 6,401,086 B1 * | 6/2002 | Bruckner ............... 1/1 |
| 6,401,239 B1 | 6/2002 | Miron |
| 6,442,651 B2 | 8/2002 | Crow et al. |
| 6,449,627 B1 | 9/2002 | Baer et al. |
| 6,457,030 B1 | 9/2002 | Adams et al. |
| 6,466,951 B1 | 10/2002 | Birkler et al. |
| 6,484,212 B1 | 11/2002 | Markowitz et al. |
| 6,487,669 B1 | 11/2002 | Waring |
| 6,493,734 B1 | 12/2002 | Sachs et al. |
| 6,496,803 B1 | 12/2002 | Ho et al. |
| 6,529,920 B1 | 3/2003 | Arons et al. |
| 6,535,857 B1 | 3/2003 | Clarke, III et al. |
| 6,542,874 B1 | 4/2003 | Walker et al. |
| 6,559,882 B1 | 5/2003 | Kerchner |
| 6,560,699 B1 | 5/2003 | Konkle |
| 6,574,658 B1 | 6/2003 | Gabber et al. |
| 6,629,138 B1 | 9/2003 | Lambert et al. |
| 6,631,495 B2 | 10/2003 | Kato et al. |
| 6,642,947 B2 | 11/2003 | Feierbach |
| 6,658,623 B1 | 12/2003 | Schilit et al. |
| 6,685,482 B2 | 2/2004 | Hopp et al. |
| 6,687,878 B1 | 2/2004 | Eintracht et al. |
| 6,704,733 B2 | 3/2004 | Clark et al. |
| 6,721,869 B1 | 4/2004 | Senthil |
| 6,724,403 B1 | 4/2004 | Santoro et al. |
| 6,725,227 B1 | 4/2004 | Li |
| 6,726,487 B1 | 4/2004 | Dalstrom |
| 6,735,583 B1 | 5/2004 | Bjarnestam et al. |
| 6,744,891 B1 | 6/2004 | Allen |
| 6,744,967 B2 | 6/2004 | Kaminski et al. |
| 6,801,751 B1 | 10/2004 | Wood et al. |
| 6,803,930 B1 | 10/2004 | Simonson |
| 6,804,489 B2 | 10/2004 | Stuppy et al. |
| 6,829,594 B1 | 12/2004 | Kitamura |
| 6,847,966 B1 | 1/2005 | Sommer et al. |
| 6,904,449 B1 | 6/2005 | Quinones |
| 6,912,398 B1 | 6/2005 | Domnitz |
| 6,933,928 B1 | 8/2005 | Lilienthal |
| 6,938,076 B2 | 8/2005 | Meyer et al. |
| 6,947,922 B1 | 9/2005 | Glance |
| 6,948,135 B1 | 9/2005 | Ruthfield et al. |
| 6,953,343 B2 | 10/2005 | Townshend |
| 6,966,029 B1 | 11/2005 | Ahern |
| 6,980,652 B1 | 12/2005 | Braitberg et al. |
| 6,985,932 B1 | 1/2006 | Glaser et al. |
| 6,992,687 B1 | 1/2006 | Baird et al. |
| 6,999,565 B1 | 2/2006 | Delaney et al. |
| 7,007,015 B1 | 2/2006 | Nayak |
| 7,009,596 B2 | 3/2006 | Seet et al. |
| 7,010,500 B2 | 3/2006 | Aarnio |
| 7,010,751 B2 | 3/2006 | Shneiderman |
| 7,020,654 B1 | 3/2006 | Najmi |
| 7,020,663 B2 | 3/2006 | Hay et al. |
| 7,054,914 B2 | 5/2006 | Suzuki et al. |
| 7,057,591 B1 | 6/2006 | Hautanen et al. |
| 7,062,707 B1 | 6/2006 | Knauft et al. |
| 7,071,930 B2 | 7/2006 | Kondo et al. |
| 7,089,292 B1 | 8/2006 | Roderick et al. |
| 7,092,116 B2 | 8/2006 | Calaway |
| 7,103,848 B2 | 9/2006 | Barsness et al. |
| 7,107,533 B2 | 9/2006 | Duncan et al. |
| 7,111,250 B1 | 9/2006 | Hayward et al. |
| 7,130,841 B1 | 10/2006 | Goel et al. |
| 7,133,506 B1 | 11/2006 | Smith |
| 7,135,932 B2 | 11/2006 | Quadir et al. |
| 7,149,776 B1 * | 12/2006 | Roy et al. ............... 709/205 |
| 7,165,217 B1 | 1/2007 | Kondo |
| 7,181,502 B2 | 2/2007 | Incertis |
| 7,188,085 B2 | 3/2007 | Pelletier |
| 7,191,346 B2 | 3/2007 | Abe et al. |
| 7,209,888 B2 | 4/2007 | Frid-Nielsen et al. |
| 7,216,116 B1 | 5/2007 | Nilsson et al. |
| 7,237,123 B2 | 6/2007 | LeVine et al. |
| 7,246,118 B2 * | 7/2007 | Chastain et al. ............... 1/1 |
| 7,249,046 B1 | 7/2007 | Katsurabayashi et al. |
| 7,249,060 B2 | 7/2007 | Ling |
| 7,249,324 B2 | 7/2007 | Nakamura et al. |
| 7,257,577 B2 | 8/2007 | Fagin et al. |
| 7,287,068 B1 | 10/2007 | Eriksson et al. |
| 7,290,285 B2 | 10/2007 | McCurdy et al. |
| 7,298,851 B1 | 11/2007 | Hendricks et al. |
| 7,304,635 B2 | 12/2007 | Seet et al. |
| 7,310,629 B1 | 12/2007 | Mendelson et al. |
| 7,313,759 B2 | 12/2007 | Sinisi |
| 7,350,704 B2 | 4/2008 | Barsness et al. |
| 7,355,591 B2 | 4/2008 | Sugimoto |
| 7,375,649 B2 | 5/2008 | Gueziec |
| 7,383,505 B2 | 6/2008 | Shimizu et al. |
| 7,386,480 B2 | 6/2008 | Sarig |
| 7,386,804 B2 | 6/2008 | Ho et al. |
| 7,398,244 B1 | 7/2008 | Keith |
| 7,401,286 B1 | 7/2008 | Hendricks et al. |
| 7,454,238 B2 | 11/2008 | Vinayak et al. |
| 7,461,406 B2 | 12/2008 | Pelly et al. |
| 7,496,767 B2 | 2/2009 | Evans |
| 7,506,246 B2 | 3/2009 | Hollander et al. |
| 7,506,356 B2 | 3/2009 | Gupta et al. |
| 7,509,270 B1 | 3/2009 | Hendricks et al. |
| 7,519,278 B2 | 4/2009 | Ikeda et al. |
| 7,533,152 B2 | 5/2009 | Stark et al. |
| 7,539,478 B2 | 5/2009 | Herley et al. |
| 7,562,032 B2 | 7/2009 | Abbosh et al. |
| 7,562,038 B1 | 7/2009 | Brumfield et al. |
| 7,574,653 B2 | 8/2009 | Croney et al. |
| 7,631,013 B2 | 12/2009 | Parsons et al. |
| 7,634,429 B2 | 12/2009 | Narin et al. |
| 7,656,127 B1 | 2/2010 | Shutt et al. |
| 7,657,459 B2 | 2/2010 | Anderson et al. |
| 7,657,831 B2 | 2/2010 | Donahue |
| 7,680,849 B2 | 3/2010 | Heller et al. |
| 7,716,224 B2 | 5/2010 | Reztlaff, II et al. |
| 7,720,892 B1 | 5/2010 | Healey, Jr. et al. |
| 7,747,949 B2 | 6/2010 | Incertis Carro |
| 7,760,986 B2 | 7/2010 | Beuque |
| 7,788,369 B2 | 8/2010 | McAllen et al. |
| 7,792,756 B2 | 9/2010 | Plastina et al. |
| 7,835,989 B1 | 11/2010 | Hendricks et al. |
| 7,849,393 B1 | 12/2010 | Hendricks et al. |

(56) References Cited

U.S. PATENT DOCUMENTS

| | | | |
|---|---|---|---|
| 7,865,405 B2 | 1/2011 | Hendricks et al. |
| 7,865,567 B1 | 1/2011 | Hendricks et al. |
| 7,865,817 B2 | 1/2011 | Ryan et al. |
| 7,870,022 B2 | 1/2011 | Bous et al. |
| 7,890,848 B2 | 2/2011 | Bodin et al. |
| 7,900,133 B2 | 3/2011 | Cragun et al. |
| 7,908,628 B2 | 3/2011 | Swart et al. |
| 7,920,112 B2 | 4/2011 | Kurihara et al. |
| 7,920,320 B2 | 4/2011 | Watson et al. |
| 8,018,431 B1 | 9/2011 | Zehr et al. |
| 8,117,128 B2 | 2/2012 | Ishibashi |
| 8,131,647 B2 | 3/2012 | Siegel et al. |
| 8,161,198 B2 | 4/2012 | Kikuchi |
| 8,165,998 B2 | 4/2012 | Semerdzhiev |
| 8,175,925 B1 | 5/2012 | Rouaix |
| 8,209,623 B2 | 6/2012 | Barletta et al. |
| 8,260,915 B1 | 9/2012 | Ashear |
| 8,312,096 B2 | 11/2012 | Cohen et al. |
| 8,341,210 B1 | 12/2012 | Lattyak et al. |
| 8,370,196 B2 | 2/2013 | Choi et al. |
| 8,417,772 B2 | 4/2013 | Lin et al. |
| 8,429,028 B2 | 4/2013 | Hendricks et al. |
| 8,452,797 B1 | 5/2013 | Paleja et al. |
| 8,510,247 B1 | 8/2013 | Kane, Jr. et al. |
| 8,601,084 B2 | 12/2013 | Carlander |
| 8,725,565 B1 | 5/2014 | Ryan |
| 8,793,575 B1 | 7/2014 | Lattyak et al. |
| 2001/0007980 A1 | 7/2001 | Ishibashi et al. |
| 2001/0025302 A1 | 9/2001 | Suzuki et al. |
| 2001/0026287 A1 | 10/2001 | Watanabe |
| 2001/0027450 A1 | 10/2001 | Shinoda et al. |
| 2001/0027478 A1 | 10/2001 | Meier et al. |
| 2001/0036822 A1 | 11/2001 | Mead et al. |
| 2001/0037328 A1 | 11/2001 | Pustejovsky et al. |
| 2001/0039493 A1 | 11/2001 | Pustejovsky et al. |
| 2001/0049623 A1 | 12/2001 | Aggarwal et al. |
| 2001/0050658 A1 | 12/2001 | Adams |
| 2001/0053975 A1 | 12/2001 | Kurihara |
| 2002/0002540 A1 | 1/2002 | DeMello et al. |
| 2002/0010707 A1 | 1/2002 | Chang et al. |
| 2002/0010759 A1 | 1/2002 | Hitson et al. |
| 2002/0012134 A1 | 1/2002 | Calaway |
| 2002/0026443 A1 | 2/2002 | Chang et al. |
| 2002/0035697 A1 | 3/2002 | McCurdy et al. |
| 2002/0046261 A1 | 4/2002 | Iwata et al. |
| 2002/0049717 A1 | 4/2002 | Routtenberg et al. |
| 2002/0054059 A1 | 5/2002 | Schneiderman |
| 2002/0057286 A1 | 5/2002 | Markel et al. |
| 2002/0059415 A1 | 5/2002 | Chang et al. |
| 2002/0069222 A1 | 6/2002 | McNeely |
| 2002/0069312 A1 | 6/2002 | Jones |
| 2002/0087532 A1 | 7/2002 | Barritz et al. |
| 2002/0090934 A1 | 7/2002 | Mitchelmore |
| 2002/0091584 A1 | 7/2002 | Clark et al. |
| 2002/0092031 A1 | 7/2002 | Dudkiewicz et al. |
| 2002/0095468 A1 | 7/2002 | Sakata |
| 2002/0101447 A1 | 8/2002 | Carro |
| 2002/0103809 A1 | 8/2002 | Starzl et al. |
| 2002/0120635 A1 | 8/2002 | Joao |
| 2002/0123336 A1 | 9/2002 | Kamada |
| 2002/0126140 A1 | 9/2002 | Gorbet et al. |
| 2002/0129012 A1 | 9/2002 | Green |
| 2002/0138291 A1 | 9/2002 | Vaidyanathan et al. |
| 2002/0138649 A1 | 9/2002 | Cartmell et al. |
| 2002/0143822 A1 | 10/2002 | Brid et al. |
| 2002/0147724 A1 | 10/2002 | Fries et al. |
| 2002/0165707 A1 | 11/2002 | Call |
| 2002/0184319 A1 | 12/2002 | Willner et al. |
| 2002/0194474 A1 | 12/2002 | Natsuno et al. |
| 2003/0005002 A1 | 1/2003 | Chen et al. |
| 2003/0009459 A1* | 1/2003 | Chastain et al. ............... 707/7 |
| 2003/0012216 A1 | 1/2003 | Novaes |
| 2003/0018720 A1 | 1/2003 | Chang et al. |
| 2003/0025731 A1 | 2/2003 | Chastain et al. |
| 2003/0028395 A1 | 2/2003 | Rodgers et al. |
| 2003/0040970 A1 | 2/2003 | Miller |
| 2003/0046233 A1 | 3/2003 | Ara et al. |
| 2003/0052928 A1 | 3/2003 | Williams |
| 2003/0058265 A1 | 3/2003 | Robinson et al. |
| 2003/0065642 A1 | 4/2003 | Zee |
| 2003/0069812 A1 | 4/2003 | Yuen et al. |
| 2003/0076513 A1 | 4/2003 | Sugimoto et al. |
| 2003/0090572 A1 | 5/2003 | Belz et al. |
| 2003/0093312 A1 | 5/2003 | Ukita et al. |
| 2003/0093382 A1 | 5/2003 | Himeno et al. |
| 2003/0097354 A1 | 5/2003 | Finlay et al. |
| 2003/0097361 A1 | 5/2003 | Huang et al. |
| 2003/0105679 A1 | 6/2003 | Krishnan et al. |
| 2003/0110503 A1 | 6/2003 | Perkes |
| 2003/0126123 A1 | 7/2003 | Kodama |
| 2003/0129963 A1 | 7/2003 | Nurcahya |
| 2003/0135495 A1 | 7/2003 | Vagnozzi |
| 2003/0152894 A1 | 8/2003 | Townshend |
| 2003/0163399 A1 | 8/2003 | Harper et al. |
| 2003/0164844 A1 | 9/2003 | Kravitz et al. |
| 2003/0182551 A1 | 9/2003 | Frantz et al. |
| 2003/0190145 A1 | 10/2003 | Copperman et al. |
| 2003/0191737 A1 | 10/2003 | Steele et al. |
| 2003/0204496 A1 | 10/2003 | Ray et al. |
| 2003/0212613 A1 | 11/2003 | Sarig |
| 2004/0002943 A1 | 1/2004 | Merrill et al. |
| 2004/0003344 A1 | 1/2004 | Lai et al. |
| 2004/0003398 A1 | 1/2004 | Donian et al. |
| 2004/0015467 A1 | 1/2004 | Fano |
| 2004/0023191 A1 | 2/2004 | Brown et al. |
| 2004/0030686 A1 | 2/2004 | Cardno et al. |
| 2004/0044723 A1 | 3/2004 | Bell et al. |
| 2004/0049743 A1 | 3/2004 | Bogward |
| 2004/0054499 A1 | 3/2004 | Starzyk et al. |
| 2004/0068471 A1 | 4/2004 | Kato |
| 2004/0078273 A1 | 4/2004 | Loeb et al. |
| 2004/0078757 A1 | 4/2004 | Golovchinsky et al. |
| 2004/0098350 A1 | 5/2004 | Labrou et al. |
| 2004/0117189 A1 | 6/2004 | Bennett |
| 2004/0128359 A1 | 7/2004 | Horvitz et al. |
| 2004/0139400 A1 | 7/2004 | Allam et al. |
| 2004/0167822 A1 | 8/2004 | Chasen et al. |
| 2004/0201633 A1 | 10/2004 | Barsness et al. |
| 2004/0205457 A1 | 10/2004 | Bent et al. |
| 2004/0210561 A1 | 10/2004 | Shen |
| 2004/0212941 A1 | 10/2004 | Haas et al. |
| 2004/0229194 A1 | 11/2004 | Yang |
| 2004/0237033 A1 | 11/2004 | Woolf et al. |
| 2004/0239703 A1 | 12/2004 | Angelica |
| 2004/0243613 A1 | 12/2004 | Pourheidari |
| 2004/0252692 A1 | 12/2004 | Shim et al. |
| 2004/0254013 A1 | 12/2004 | Quraishi et al. |
| 2004/0254917 A1 | 12/2004 | Brill et al. |
| 2004/0267552 A1 | 12/2004 | Gilliam et al. |
| 2004/0268253 A1 | 12/2004 | DeMello et al. |
| 2005/0021464 A1 | 1/2005 | Lindauer et al. |
| 2005/0022113 A1 | 1/2005 | Hanlon |
| 2005/0044148 A1 | 2/2005 | Son et al. |
| 2005/0044224 A1 | 2/2005 | Jun et al. |
| 2005/0066219 A1 | 3/2005 | Hoffman et al. |
| 2005/0069225 A1 | 3/2005 | Schneider et al. |
| 2005/0069849 A1 | 3/2005 | McKinney et al. |
| 2005/0076012 A1 | 4/2005 | Manber et al. |
| 2005/0088410 A1 | 4/2005 | Chaudhri |
| 2005/0091604 A1 | 4/2005 | Davis |
| 2005/0097007 A1 | 5/2005 | Alger et al. |
| 2005/0102618 A1 | 5/2005 | Naito |
| 2005/0125222 A1 | 6/2005 | Brown et al. |
| 2005/0132281 A1* | 6/2005 | Pan et al. ............... 715/515 |
| 2005/0138007 A1 | 6/2005 | Amitay |
| 2005/0138428 A1 | 6/2005 | McAllen et al. |
| 2005/0144221 A1 | 6/2005 | Shin et al. |
| 2005/0144895 A1 | 7/2005 | Grimes et al. |
| 2005/0154601 A1 | 7/2005 | Halpern et al. |
| 2005/0176438 A1 | 8/2005 | Li |
| 2005/0177562 A1 | 8/2005 | Raciborski |
| 2005/0177567 A1 | 8/2005 | Hughes et al. |
| 2005/0193330 A1 | 9/2005 | Peters |
| 2005/0195975 A1 | 9/2005 | Kawakita |

(56) References Cited

U.S. PATENT DOCUMENTS

| | | |
|---|---|---|
| 2005/0198070 A1 | 9/2005 | Lowry |
| 2005/0222977 A1 | 10/2005 | Zhou et al. |
| 2005/0223315 A1 | 10/2005 | Shimizu et al. |
| 2005/0228836 A1 | 10/2005 | Bacastow et al. |
| 2005/0250439 A1 | 11/2005 | Leslie |
| 2005/0256822 A1 | 11/2005 | Hollingsworth |
| 2005/0257261 A1 | 11/2005 | Shraim et al. |
| 2005/0262258 A1 | 11/2005 | Kohno et al. |
| 2005/0289394 A1 | 12/2005 | Arrouye et al. |
| 2006/0004840 A1 | 1/2006 | Senda |
| 2006/0020469 A1 | 1/2006 | Rast |
| 2006/0031316 A1 | 2/2006 | Forstadius |
| 2006/0045470 A1 | 3/2006 | Poslinski et al. |
| 2006/0047830 A1 | 3/2006 | Nair et al. |
| 2006/0047844 A1 | 3/2006 | Deng |
| 2006/0048184 A1 | 3/2006 | Poslinski et al. |
| 2006/0053045 A1 | 3/2006 | Danielson et al. |
| 2006/0057960 A1 | 3/2006 | Tran |
| 2006/0061595 A1 | 3/2006 | Goede et al. |
| 2006/0069697 A1 | 3/2006 | Shraim et al. |
| 2006/0071754 A1 | 4/2006 | Tofts et al. |
| 2006/0075205 A1 | 4/2006 | Martin et al. |
| 2006/0075444 A1 | 4/2006 | Dillen |
| 2006/0077897 A1 | 4/2006 | Kotzin |
| 2006/0080261 A1 | 4/2006 | Christal |
| 2006/0095404 A1 | 5/2006 | Adelman et al. |
| 2006/0098900 A1 | 5/2006 | King et al. |
| 2006/0101328 A1 | 5/2006 | Albornoz et al. |
| 2006/0109242 A1 | 5/2006 | Simpkins |
| 2006/0123053 A1 | 6/2006 | Scannell, Jr. |
| 2006/0129618 A1 | 6/2006 | Maier |
| 2006/0129924 A1 | 6/2006 | Nelson et al. |
| 2006/0143558 A1 | 6/2006 | Albornoz et al. |
| 2006/0145950 A1 | 7/2006 | Tanaka |
| 2006/0156222 A1 | 7/2006 | Chi et al. |
| 2006/0161635 A1 | 7/2006 | Lamkin et al. |
| 2006/0175983 A1 | 8/2006 | Crouse et al. |
| 2006/0179137 A1 | 8/2006 | Jennings, III et al. |
| 2006/0190489 A1* | 8/2006 | Vohariwatt et al. ........ 707/104.1 |
| 2006/0190568 A1 | 8/2006 | Patterson |
| 2006/0195431 A1 | 8/2006 | Holzgrafe et al. |
| 2006/0209175 A1* | 9/2006 | Cohen et al. ................. 348/14.01 |
| 2006/0236240 A1* | 10/2006 | Lebow ........................... 715/531 |
| 2006/0240799 A1 | 10/2006 | Kim et al. |
| 2006/0250994 A1 | 11/2006 | Sasaki et al. |
| 2006/0253441 A1 | 11/2006 | Nelson |
| 2006/0253458 A1 | 11/2006 | Dixon et al. |
| 2006/0253461 A1 | 11/2006 | de Bonet |
| 2006/0256083 A1 | 11/2006 | Rosenberg |
| 2006/0265518 A1 | 11/2006 | Owens et al. |
| 2006/0271629 A1 | 11/2006 | MacDowell |
| 2006/0281058 A1 | 12/2006 | Mangoaela |
| 2006/0282797 A1 | 12/2006 | Barsness et al. |
| 2007/0005616 A1 | 1/2007 | Hay et al. |
| 2007/0005757 A1 | 1/2007 | Finger et al. |
| 2007/0014404 A1 | 1/2007 | Cha |
| 2007/0016555 A1 | 1/2007 | Ito et al. |
| 2007/0025704 A1 | 2/2007 | Tsukazaki et al. |
| 2007/0039023 A1 | 2/2007 | Kataoka |
| 2007/0050346 A1 | 3/2007 | Goel et al. |
| 2007/0055926 A1* | 3/2007 | Christiansen et al. ........ 715/512 |
| 2007/0061335 A1 | 3/2007 | Ramer et al. |
| 2007/0061337 A1 | 3/2007 | Saito et al. |
| 2007/0061803 A1 | 3/2007 | Barrett |
| 2007/0073596 A1 | 3/2007 | Alexander et al. |
| 2007/0078273 A1 | 4/2007 | Hirota |
| 2007/0079236 A1 | 4/2007 | Schrier et al. |
| 2007/0079383 A1 | 4/2007 | Gopalakrishnan |
| 2007/0094285 A1 | 4/2007 | Agichtein et al. |
| 2007/0094351 A1 | 4/2007 | Kalish et al. |
| 2007/0105536 A1 | 5/2007 | Tingo, Jr. |
| 2007/0112817 A1 | 5/2007 | Danninger |
| 2007/0118533 A1 | 5/2007 | Ramer et al. |
| 2007/0130109 A1 | 6/2007 | King et al. |
| 2007/0136660 A1 | 6/2007 | Gurcan et al. |
| 2007/0136679 A1 | 6/2007 | Yang |
| 2007/0142934 A1 | 6/2007 | Boercsoek et al. |
| 2007/0150456 A1 | 6/2007 | Lian et al. |
| 2007/0162961 A1 | 7/2007 | Tarrance et al. |
| 2007/0174545 A1 | 7/2007 | Okada et al. |
| 2007/0185865 A1 | 8/2007 | Budzik et al. |
| 2007/0189719 A1 | 8/2007 | Furumachi et al. |
| 2007/0219983 A1 | 9/2007 | Fish |
| 2007/0233562 A1 | 10/2007 | Lidwell et al. |
| 2007/0233692 A1 | 10/2007 | Lisa et al. |
| 2007/0234209 A1* | 10/2007 | Williams ...................... 715/700 |
| 2007/0238077 A1 | 10/2007 | Strachar |
| 2007/0240187 A1 | 10/2007 | Beach et al. |
| 2007/0242225 A1 | 10/2007 | Bragg et al. |
| 2007/0250573 A1 | 10/2007 | Rothschild |
| 2007/0282809 A1 | 12/2007 | Hoeber et al. |
| 2007/0283173 A1 | 12/2007 | Webb et al. |
| 2007/0288853 A1 | 12/2007 | Neil |
| 2008/0005097 A1 | 1/2008 | Kleewein et al. |
| 2008/0005203 A1 | 1/2008 | Bots et al. |
| 2008/0005664 A1* | 1/2008 | Chandra ....................... 715/513 |
| 2008/0016064 A1 | 1/2008 | Sareday et al. |
| 2008/0016164 A1 | 1/2008 | Chandra |
| 2008/0027933 A1* | 1/2008 | Hussam ........................... 707/6 |
| 2008/0031595 A1 | 2/2008 | Cho |
| 2008/0040233 A1 | 2/2008 | Wildman et al. |
| 2008/0059702 A1 | 3/2008 | Lu et al. |
| 2008/0066155 A1 | 3/2008 | Abraham |
| 2008/0082518 A1 | 4/2008 | Loftesness |
| 2008/0082911 A1 | 4/2008 | Sorotokin et al. |
| 2008/0089665 A1 | 4/2008 | Thambiratnam et al. |
| 2008/0113614 A1 | 5/2008 | Rosenblatt |
| 2008/0115224 A1* | 5/2008 | Jogand-Coulomb et al. ... 726/27 |
| 2008/0120101 A1 | 5/2008 | Johnson et al. |
| 2008/0120280 A1 | 5/2008 | Iijima et al. |
| 2008/0133479 A1 | 6/2008 | Zelevinsky et al. |
| 2008/0154908 A1* | 6/2008 | Datar et al. ..................... 707/10 |
| 2008/0163039 A1 | 7/2008 | Ryan et al. |
| 2008/0164304 A1 | 7/2008 | Narasimhan et al. |
| 2008/0165141 A1 | 7/2008 | Christie |
| 2008/0168073 A1 | 7/2008 | Siegel et al. |
| 2008/0208833 A1 | 8/2008 | Basmov |
| 2008/0222552 A1 | 9/2008 | Batarseh et al. |
| 2008/0235351 A1 | 9/2008 | Banga et al. |
| 2008/0243788 A1 | 10/2008 | Reztlaff, II et al. |
| 2008/0243814 A1 | 10/2008 | Gurcan et al. |
| 2008/0243828 A1 | 10/2008 | Reztlaff, II et al. |
| 2008/0259057 A1 | 10/2008 | Brons |
| 2008/0270930 A1 | 10/2008 | Slosar |
| 2008/0281058 A1 | 11/2008 | Araki |
| 2008/0293450 A1 | 11/2008 | Ryan et al. |
| 2008/0294674 A1 | 11/2008 | Reztlaff, II et al. |
| 2008/0295039 A1 | 11/2008 | Nguyen et al. |
| 2008/0298083 A1 | 12/2008 | Watson et al. |
| 2008/0301820 A1 | 12/2008 | Stevens |
| 2009/0094528 A1 | 4/2009 | Gray et al. |
| 2009/0094540 A1 | 4/2009 | Gray et al. |
| 2009/0181649 A1 | 7/2009 | Bull et al. |
| 2009/0228774 A1 | 9/2009 | Matheny et al. |
| 2009/0231233 A1 | 9/2009 | Liberatore |
| 2009/0241054 A1 | 9/2009 | Hendricks |
| 2009/0263777 A1 | 10/2009 | Kohn |
| 2009/0267909 A1 | 10/2009 | Chen et al. |
| 2009/0296331 A1 | 12/2009 | Choy |
| 2009/0319482 A1 | 12/2009 | Norlander et al. |
| 2010/0023259 A1* | 1/2010 | Krumm et al. ................ 701/208 |
| 2010/0081120 A1 | 4/2010 | Nanjiani et al. |
| 2010/0095340 A1 | 4/2010 | Ei et al. |
| 2010/0125876 A1 | 5/2010 | Craner et al. |
| 2010/0131385 A1 | 5/2010 | Harrang et al. |
| 2010/0164888 A1 | 7/2010 | Okumura et al. |
| 2010/0188327 A1 | 7/2010 | Frid et al. |
| 2010/0284036 A1 | 11/2010 | Ahn et al. |
| 2010/0328223 A1 | 12/2010 | Mockarram-Dorri et al. |
| 2011/0050591 A1 | 3/2011 | Kim et al. |
| 2011/0050594 A1 | 3/2011 | Kim et al. |
| 2011/0057884 A1 | 3/2011 | Gormish et al. |
| 2011/0069073 A1 | 3/2011 | Unger |
| 2011/0112671 A1 | 5/2011 | Weinstein |

(56) References Cited

U.S. PATENT DOCUMENTS

| | | | |
|---|---|---|---|
| 2011/0191710 | A1 | 8/2011 | Jang et al. |
| 2011/0267333 | A1 | 11/2011 | Sakamoto et al. |
| 2011/0295926 | A1 | 12/2011 | Battiston et al. |
| 2012/0001923 | A1 | 1/2012 | Weinzimmer et al. |
| 2012/0016774 | A1 | 1/2012 | Dicke et al. |
| 2012/0036431 | A1 | 2/2012 | Ito et al. |
| 2012/0041941 | A1 | 2/2012 | King et al. |
| 2012/0079372 | A1 | 3/2012 | Kandekar et al. |
| 2012/0197998 | A1 | 8/2012 | Kessel et al. |
| 2012/0227001 | A1 | 9/2012 | Gupta et al. |
| 2013/0219320 | A1 | 8/2013 | SEET; Chern Hway; et al. |
| 2013/0246157 | A1 | 9/2013 | Puppin et al. |
| 2014/0218286 | A1 | 8/2014 | Kim; John T. |

FOREIGN PATENT DOCUMENTS

| | | |
|---|---|---|
| CN | 101120358 | 2/2008 |
| EP | 1197902 | 4/2002 |
| EP | 1842150 | 10/2007 |
| JP | 6274493 A | 9/1994 |
| JP | 07078139 | 3/1995 |
| JP | 09179870 | 7/1997 |
| JP | 10091640 | 4/1998 |
| JP | 11074882 | 3/1999 |
| JP | 2000501214 | 2/2000 |
| JP | 2001052016 | 2/2001 |
| JP | 2001052025 | 2/2001 |
| JP | 2001195412 | 7/2001 |
| JP | 2001236358 | 8/2001 |
| JP | 2002099739 A | 4/2002 |
| JP | 2002197079 A | 7/2002 |
| JP | 2002259718 | 9/2002 |
| JP | 2002536736 | 10/2002 |
| JP | 2003016104 | 1/2003 |
| JP | 2003122969 | 4/2003 |
| JP | 2003513384 | 4/2003 |
| JP | 2003516585 | 5/2003 |
| JP | 2003517158 | 5/2003 |
| JP | 2003186910 | 7/2003 |
| JP | 2005056041 | 3/2005 |
| JP | 2006011694 | 1/2006 |
| JP | 2006107496 | 4/2006 |
| JP | 2006129323 | 5/2006 |
| JP | 2006190114 | 7/2006 |
| JP | 2008071334 | 3/2008 |
| JP | 2008516297 | 5/2008 |
| JP | 2008527580 | 7/2008 |
| JP | 2008197634 | 8/2008 |
| KR | 1020020020262 | 3/2002 |
| WO | WO97/20274 | 6/1997 |
| WO | WO9720274 | 6/1997 |
| WO | WO00/45588 | 8/2000 |
| WO | WO0045588 | 8/2000 |
| WO | WO0056055 A2 | 9/2000 |
| WO | WO0075840 A2 | 12/2000 |
| WO | WO01/42978 | 6/2001 |
| WO | WO0239206 | 5/2002 |
| WO | WO2004055647 A2 | 7/2004 |
| WO | WO2006078728 A2 | 7/2006 |

OTHER PUBLICATIONS

European Office Action mailed Mar. 26, 20010 for European Patent Application No. 06718773.2, a counterpart foreign application of U.S. Appl. No. 11/039,645.

Office action for U.S. Appl. No. 11/763,357, mailed on May 26, 2011, Reztlaff, "Obtaining and Verifying Search Indices".

Final Office Action for U.S. Appl. No. 11/763,314, mailed on Jun. 13, 2011, Craig S. Griffin, "Display Dependent Markup Language".

Non-Final Office Action for U.S. Appl. No. 11/693,682, mailed on Jun. 9, 2011, Hilliard B. Siegel, "Providing Annotations of a Digital Work".

Office action for U.S. Appl. No. 12/333,215, mailed on Jul. 18, 2011, Zagorie et al., "Device-Specific Presentation Control for Electronic Book Reader Devices", 22 pages.

Non-Final Office Action for U.S. Appl. No. 11/693,685, John Lattyak, "Relative Progress and Event Indicators".

U.S. Appl. No. 11/537,484, filed Sep. 29, 2006, Thomas Ryan, "Expedited Acquisition of a Digital Item Following a Sample Presentation of the Item."

U.S. Appl. No. 11/537,518, filed Sep. 29, 2006, John Lattyak, "Acquisition of an Item based on a Catalog Presentation of Items."

U.S. Appl. No. 11/693,685, filed Mar. 29, 2007, John Lattyak; John Kim; Steven Moy; Laurent An Minh Nguyen, "Relative Progress and Event Indicators."

U.S. Appl. No. 11/763,314, filed Jun. 14, 2007, John Lattyak; Craig Griffin; Steven Weiss, "Display Dependent Markup Language."

U.S. Appl. No. 11/763,339, filed Jun. 14, 2007, David Isbister; Marshall Willilams; Nicholas Vaccaro, "Power Management Techniques for a User Device."

U.S. Appl. No. 11/763,357, filed Jun. 14, 2007, James Reztlaff II; John Lattyak, "Obtaining and Verifying Search Indices."

U.S. Appl. No. 11/763,363, filed Jun. 14, 2007, James Reztlaff II; Thomas Ryan, "Search Results Generation and Sorting."

U.S. Appl. No. 11/763,375, filed Jun. 14, 2007, John Lattyak, Girish Bansil Bajaj, Kevin R. Cheung, Thomas Fruchterman, Robert L. Goodwin, Kenneth P. Kiraly, Richard Moore, Subram Narasimhan, Thomas A. Ryan, Michael V. Rykov, Jon Saxton, James C. Slezak, Beryl Tomay, Aviram Zagorie, Gregg Elliott Zehr, "Delivery of Items for Consumption by a User Device."

U.S. Appl. No. 11/763,376, filed Jun. 14, 2007, Kenneth Kiraly; Thomas Ryan; Gregg Zehr; John Lattyak; Michael Rykov; Girish Bansilal Bajaj; James Slezak; Aviram Zagorie; Richard Moore; Kevin Cheung; Thomas Fruchterman; Robert Goodwin, "Notification of a User Device to Perform an Action."

U.S. Appl. No. 11/763,378, filed Jun. 14, 2007, John Lattyak; Thomas Ryan; Gregg Zehr; Kenneth Kiraly; Michael Rykov; Girish Bansilal Bajaj; James Slezak; Aviram Zagorie; Richard Moore; Kevin Cheung; Thomas Fruchterman; Robert Goodwin; Xiaotian Guo, "Transfer of Instructions to a User Device."

U.S. Appl. No. 11/763,381, filed Jun. 14, 2007, Michael Rykov; Girish Bansilal Bajaj; James Slezak; Aviram Zagorie; Richard Moore; Kevin Cheung; Thomas Fruchterman; Robert Goodwin, "Selecting and Providing Items in a Media Consumption System."

U.S. Appl. No. 11/763,386, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin, "Handling of Subscription-Related Issues in a Media Consumption System."

U.S. Appl. No. 11/763,390, filed Jun. 14, 2007, Girish Bansilal Bajaj; Michael Rykov; James Slezak; Aviram Zagorie; Richard Moore; Kevin Cheung; Thomas Fruchterman; Robert Goodwin,, "Providing User-Supplied Items to a User Device."

U.S. Appl. No. 11/763,392, filed Jun. 14, 2007, Thomas Ryan; Gregg Zehr; Kenneth Kiraly; John Lattyak; Subram Narasimhan; Michael Rykov; Girish Bansilal Bajaj; James Slezak; Aviram Zagorie; Richard Moore; Kevin Cheung; Thomas Fruchterman; Robert Goodwin, "Administrative Tasks in a Media Consumption System ."

U.S. Appl. No. 11/763,393, filed Jun. 14, 2007, John Lattyak; Michael Rykov; Girish Bansilal Bajaj; James Slezak; Aviram Zagorie; Richard Moore; Kevin Cheung; Thomas Fruchterman; Robert Goodwin,, "Incremental Updates of Items ."

U.S. Appl. No. 11/763,395, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin; James Reztlaff II, "Providing Supplemental Information Based on Hints in a Media Consumption System ."

U.S. Appl. No. 11/963,618, filed Dec. 21, 2007, Michael Rykov; Laurent An Minh Nguyen; Steven Moy, "Dissemination of Periodical Samples."

U.S. Appl. No. 12/333,215, filed Dec. 11, 2008, Aviram Zagorie; Craig Griffin; John Lattyak; Michael Rykov, "Device-Specific Presentation Control for Electronic Book Reader Devices."

U.S. Appl. No. 12/351,629, filed Jan. 9, 2009, John Johnston; Weiping Dou; Steven Chase, "Antenna Placement on Portable Device ."

(56) References Cited

OTHER PUBLICATIONS

U.S. Appl. No. 12/351,663, filed Jan. 9, 2009, Chris Li; Steven Chase, "Surface Mount Clip for Routing and Grounding Cables."
Cleveland, Jr. et al., "Questions and Answers about Biological Effects and Potential Hazards of Radiofrequency Electromagnetic Fields" OET Bulletin 56, Fourth Edition, Aug. 1999, 38 pages.
Cleveland, Jr., et al, "Evaluating Compliance with FCC Guidelines for Human Exposure to Radiofrequency Electromagnetic Fields" OET Bulletin 65, Edition 97-01, Aug. 1997, 84 pages.
Means, et al., "Evaluating Compliance with FCC Guidelines for Human Exposure to Radiofrequency Electromagnetic Fields", OET Bulletin 65 Edition 97-01, Jun. 2001, 57 pages.
OQO "A Full PC That Fits in Your Pocket" Retrieved on Sep. 22, 2008 at <<http://www.oqo.com/support/documentation.html>>.
PCT Search Report for International Application No. PCT/US 08/57848, mailed Jul. 7, 2008 (9 pages).
PCT Search Report for International Application No. PCT/US 08/64387, mailed Sep. 9, 2008 (2 pages).
Navarro, et al., "Modern Information Retrieval, Chapter 8: Indexing and Searching", Jan. 1, 1999, Modern Information Retrieval, ACM Press, New York, pp. 191-228.
BarnesandNoble.com, "Barnes and Noble Homepage", retrieved on Aug. 2, 2001 http://web.archive.org/web/19981202183957/http://www.barnesandnoble.com/, Dec. 2, 1998.
Cavanaugh, "EBooks and Accommodations", Teaching Exceptional Children, vol. 35, No. 2, Copyright 2002 CEC, 6 pages.
Translated Chinese Office Action mailed Jul. 14, 2011 for Japanese patent application No. 20078004873.9, a counterpart foreign application of US patent No. 7,865,817, 6 pages.
Office action for U.S. Appl. No. 12/414,914, mailed on Aug. 4, 2011, Agarwal et al., "Questions on Highlighted Passages", 39 pages.
Non-final Office Action for U.S. Appl. No. 11/537,484, mailed on Aug. 19, 2011, Thomas A. Ryan, "Expedited Acquisition of a Digital Item Following a Sample Presentation of the Item", 13 pages.
Non-final Office Action for U.S. Appl. No. 11/763,363, mailed on Aug. 26, 2011, James R. Rezlaff II, "Search Results Generation and Sorting", 10 pages.
Beigbeder et al., "An Information Retrieval Model Using the Fuzzy Proximity Degree of Term Occurences", 2005 ACM Symposium on Applied Computing, pp. 1018-1022.
Biskup, J., et al, "Towards a Credential-Based Implementation of Compound Access Control Policies" SACMAT '04, Proceedings of the ninth ACM symposium on Access control models and technologies, Jun. 4, 2004, NY, retrieved from the internet: http://portal.acm.org/citation.cfm?id=990036.990042 (retrieved Nov. 9, 2010.
Breu, M. et al., "The Medoc Distributed Electronic Library: Accounting and Security Aspects", Electronic Publishing, New Models and Opportunities, Proceedings of an ICCC/IFIP Conference, Apr. 14, 1997, pp. 237-249.
Gladney, H. M.: "Access Control for Large Collections", NY, vol. 15, No. 2, Apr. 1, 1997, pp. 154-194.
Henke, H. "Survey on Electronic Book Features", Open eBook Forum, online, Mar. 20, 2002, pp. 1-14, retrieved from the internet: <http://www.openebook.org/doc_library/surveys/IDPF_eBook_Features_2002.pdf> retrieved Nov. 8, 2010.
Ziviani, N ED, Baeza-Yates R. et at: "Modern Information Retrieval, Text Operations", Jan. 1, 1999, Modern Information Retrieval, ACM Press, NY, pp. 163-190.
Zobel, J. et al., "Inverted Files for Text Search Engines" ACM Computing Surveys, vol. 38, No. 2, Jul. 1, 2006, pp. 1-56, NY, NY.
"A Universally Unique IDentifier (UUID) URN Namespace", Jul. 2005, IETF, all pages. Retrieved on Apr. 21, 2010 at http://tools.ietf.org/pdf/rfc4122.pdf.
Bellwood, et al., "UDDI Version 2.04 API Specification UDDI Committee Specification, Jul. 19, 2002", Oasis, all pages. Retrieved on Apr. 21, 2010 via Wayback Machine at http://web.archive.org/web/20050314033213/www.oasis-open.org/committees/uddi-spec/doc/tcspecs.htm.
PCT Search Report for PCT Application No. PCT/US10/22060, mailed Mar. 8, 2010 (7 pages).

"Universal Unique Identifier", dated Dec. 16, 2002. The Open Group, all pages. Retrieved on Apr. 21, 2010 via Wayback Machine at http://web.archive.org/web/20021216070918/http://www.opengroup.org/onlinepubs/9629399/apdxa.htm.
"Web Services Architecture: W3C Working Group Note Feb. 11, 2004", Feb. 11, 2004, W3C, all pages. Retrieved on Apr. 21, 2010 via Wayback Machine at http://web.archive.org/web/2004040205185/http://www.w3.org/TR/ws-arch/.
U.S. Appl. No. 11/277,894, filed Mar. 29, 2006, Jateen P. Parekh, Gregg E. Zehr, and Subram Narasimhan, "Reader Device Content Indexing".
U.S. Appl. No. 12/360,744, filed Jan. 27, 2009, Rajiv Kotesh Ghanta; Marcos Frid; Joseph J. Hebenstreit; John T. Kim, "Electronic Device With Haptic Feedback."
U.S. Appl. No. 12/366,941, filed Feb. 6, 2009, Scott Dixon; Eriel Thomas, "Bundled Digital Content."
U.S. Appl. No. 12/414,914, filed Mar. 31, 2009, Amit Agarwal; Zaur Kambarov; Tom Killalea, "Questions on Highlighted Passages."
U.S. Appl. No. 29/331,528, filed Jan. 27, 2009, Chris Green, "User Interface Cluster."
Bradley, "Plastic Shape Shifter", retreived on May 7, 2009 at <<http://www.reactivereports.com/61/61_3.html>>, Chemistry WebMagazine, Issue No. 61, Dec. 2006, 2 pgs.
Cavanaugh "EBooks and Accommodations", Teaching Expectional Children vol. 35 No. 2 p. 56-61 Copyright 2002 CEC, pp. 56-61.
Chi et al. "eBooks with Indexes that Reorganize Conceptually", CHI2004, Apr. 24-29, 2004, Vienna, Austria ACM 1-58113-703-6/04/0004, pp. 1223-1226.
Davison et al. "The Use of eBooks and Interactive Multimedia, as Alternative Forms of Technical Documentation" SIGDOC'05, Sep. 21-23, 2005, Conventry, United Kingdom, Copyright 2005 ACM 1-59593-175-9/05/0009, pp. 108-115.
Elspass, et al., "Portable Haptic Interface with Active Functional Design", In Proceedings SPIE Conference on Smart Structures and Integrated Systems, Newport Beach, California, vol. 3668, Mar. 1999, 926-932.
"Haptic History—Machine Haptics (Expansion)" retrieved on May 7, 2009 at <<http://hapticshistory.chc61.uci.cu/haptic/site/pages/Machine-Haptics-Became_5.php.>> from Google's cache, text-only version as webpage appeared on Apr. 16, 2009, 8 pgs.
Jones, et al., "Development of a Tactile Vest", IEEE Computer Society, In the Proceedings of the 12th International Symposium on Haptic Inerfaces for Virtual Environment and Teleoperator Systems, Mar. 27-28, 2004, pp. 82-89.
Leutwyler, "Shape-shifting Polymer Gels", retrieved on May 7, 2009 at <<http://www.scientificamerican.com/article.cfm?id=shape-shifting-polymer-ge&print=true>>, Scientific American, Nov. 9, 2000, 1 pg.
Nakatani, et al., "3D Form Display with Shape Memory Alloy", In Proceedings of 13th International Conference on Artificial Reality and Teleexistence (ICAT), 2003, pp. 179-184.
"Shape Memory Polymer", retrieved on May 7, 2009 at <<http://en.wikipedia.org/wiki/Shape_Memory_Polymer>>, Wikipedia, 8 pgs.
Sohn et al. "Development of a Standard Format for eBooks", SAC2002, Madrid, Spain, 2002 ACM 1-58113-445-2/02/0, pp. 535-540.
Wellman, et al., "Mechanical Design and Control of a High-Bandwidth Shape Memory Alloy Tactile Display", Springer-Verlag, In the Proceedings of the International Symposium on Experimental Robotics, Barcelona, Spain, Jun. 1997, pp. 56-66, 12 pgs.
Yoshikawa, et al., "Vertical Drive Micro Actuator for Haptic Display Using Shape Memory Alloy Thin Film", IEE Japan, Papers of Technical Meeting on Micromachine and Sensor System, Journal Code L2898B, vol. MSS-05, No. 21-44, 2005, pp. 103-108.
"Annotation Engine," Berkman Center for Internet & Society at Harvard Law School <http://cyber.law.harvard.edu/proj ectsl annotate.html> [Retrieved Jan. 30, 2004].
"Annotator Instructions," Berkman Center for Internet & Society at Harvard Law School <<http://cyber.law.harvard.edu/annotate/instructions.html>>, also found at <<http://cyber.law.harvard.edu/cite/instructions.html>>, [Retrieved Jan. 30, 2004].

(56) References Cited

OTHER PUBLICATIONS

"Annotator Wishlist," Berkman Center for Internet & Society at Harvard Law School r <http://cyber.law.harvard.edulcite/annotate.cgi ?action=print&markup ;center=; view=http%3A%2F%2Fcy ... > [Retrieved Jan. 30, 2004].
Roscheisen, M., et al., "Beyond Browsing: Shared Comments, SOAPs, Trails, and On-Line Communities," Computer Networks and ISDN Systems 27:739-749, 1995.
Canadian Office Action mailed Apr. 14, 2009 for Canadian Patent Application No. 2594573, a counterpart foreign application of U.S. Appl. No. 11/039,645.
Translated Chinese Office Action mailed May 9, 2008 for Chinese Patent Application No. 200680002606.2, a counterpart foreign application of U.S. Appl. No. 11/039,645.
Translated Chinese Second Office Action mailed Jun. 5, 2009 for Chinese Patent Application No. 200680002606.2, a counterpart foreign application of U.S. Appl. No. 11/039,645.
Translated Chinese Third Office Action mailed Nov. 27, 2009 for Chinese Patent Application No. 200680002606.2, a counterpart foreign application of U.S. Appl. No. 11/039,645.
Carter, S., et al., "Digital Graffiti: Public Annotation of Multimedia Content," Proceedings o/the CHI2004, Vienna, Austria, Apr. 24-29, 2004, pp. 1207-1210.
Extended European Search Report mailed Dec. 22, 2009, issued in corresponding European Patent Application No. EP 06 71 8773.2, filed Jan. 18, 2006.
European Office Action mailed Dec. 12, 2009 for European Patent Application No. 06718773.2, a counterpart foreign application of U.S. Appl. No. 11/039,645.
European Search report mailed Dec. 22, 2009 for European Patent Application No. 06718773.2, a counterpart foreign application of U.S. Appl. No. 11/039,645.
Office Action for U.S. Appl. No. 11/763,375, mailed Feb. 23, 2010, 15 pages.
Translated Japanese Office Action mailed Jan. 25, 2011 for Japanese Patent Application No. 2007-552235, a counterpart foreign application of U.S. Appl. No. 11/039,645.
Non-Final Office Action for U.S. Appl. No. 11/537,518, mailed on Apr. 28, 2011, John Lattyak, "Acquisition of an Item Based on a Catalog Presentation of Items".
International Search Report mailed Sep. 9, 2008, in International Application No. PCT/US/08/64387, filed May 21, 2008, 1 page.
International Search Report mailed Aug. 15, 2008, in International Application No. PCT/US07/89105, filed Dec. 28, 2007, 2 pages.
International Search Report mailed Aug. 15, 2008, in corresponding International Application No. PCT/US08/57829, filed Mar. 21, 2008, 1 page.
International Search Report mailed Jul. 7, 2008, in International Application No. PCT/US08/57848, filed Mar. 31, 2008, 2 pages.
PCT International Search Report and the Written Opinion for Application No. PCT/US 08/64389, mailed on Jan. 28, 2009, 7 pgs.
PCT International Search Report and the Written Opinion for Application No. PCT/US2006/001752, mailed on Jul. 27, 2006, 8 pgs.
"Say NO To Third Voice," Worldzone.net, 1999-2004, <http://worldzone.netiinternetipixelsnttv/index.html> [retrieved Jan. 30, 2004].
"The Berkman Center for Internet & Society at Harvard Law School: Annotation Engine," Harvard.Edu, 1999-2004, <http://cyber.iaw.harvard.eduJprojects/annotate.html> [Retrieved Jan. 30, 2004].
Marshall, C.C., "The Future of Annotation in a Digital (Paper) World," Proceedings o/the 35th Annual GSLIS Clinic, University of Illinois at UrbanaChampaign, Urbana, 11, Mar. 22-24, 1998, pp. 1-19.
Kumar, A., "Third Voice Trails off . . . ," Wired News, 2004, <http://www.wired.comlnews/printIO. 1294,42803 ,00.html> [retrieved Jan. 30, 2004].
Desmoulins et al., "Pattern-Based Annotations on E-books: From Personal to Shared Didactic Content", Proceedings of the IEEE International Workshop on Wireless adn Mobile Techniques in Education, 2002, 4 pages.
Leach et al, "A Universally Unique IDentifier (UUID) URN Namespace", Jul. 2005, IETF, retrieved on Apr. 21, 2010 at http://tools.ietf.org/pdf/rfc4122.pdf, 32 pgs.
Card et al., "3Book: A 3D Electronic Smart Book", AVI'04 May 25-28, 2004, Hallipoli, Italy, ACM 2004, pp. 303-307.
Translated Chinese Office Action mailed Oct. 10, 2011 for Chinese patent application No. 200880017259.X, a counterpart foreign application of U.S. Appl. No. 11/693,682, 7 pages.
Translated Chinese Office Action mailed Aug. 25, 2011 for Chinese patent application No. 200880024964.2, a counterpart foreign application of U.S. Appl. No. 11/763,358, 6 pages.
Translated Chinese Office Action mailed Sep. 26, 2011 for Chinese patent application No. 200880017589.9, a counterpart foreign application of U.S. Appl. No. 11/763,369, 9 pages.
Translated Chinese Office Action mailed Sep. 30, 2011 for Chinese patent application No. 200880025056.5, a counterpart foreign application of U.S. Appl. No. 11/763,374, 9 pages.
Translated Japanese Office Action mailed Oct. 25, 2011 for Japanese patent application No. 2007-552235, a counterpart foreign application of U.S. Appl. No. 11/039,645, 3 pages.
Mercier et al., "Sphere of influence Model in Information retrieval", IEEE 2005 International Conference on Fuzzy Systems, pp. 120-125.
Final Office Action for U.S. Appl. No. 11/537,484, mailed on Jan. 24, 2012, Thomas A. Ryan, "Expedited Acquisition of a Digital Item Following a Sample Presentation of the Item", 22 pages.
Final Office Action for U.S. Appl. No 12/414,914, mailed on Jan. 4, 2012, Agarwal et al., "Questions on Highlighted Passages", 41 pages.
Final Office Action for U.S. Appl. No. 11/763,392, mailed on Oct. 14, 2011, Thomas Ryan, "Administrative Tasks in a Media Consumption System", 38 pages.
Office action for U.S. Appl. No. 11/763,390, mailed on Oct. 24, 2011, Bajaj et al., "Providing User-Supplied Items to a User Device", 11 pages.
Final Office Action for U.S. Appl. No. 12/759,828, mailed on Nov. 10, 2011, James R. Retzalff II, "Search and Indexing on a User Device", 16 pages.
Final Office Action for U.S. Appl. No. 11/537,518, mailed on Nov. 25, 2011, John Lattyak, "Acquisition of an Item Based on a Catalog Presentation of Items," 8 pages.
Non-Final Office Action for U.S. Appl. No. 11/763,386, mailed on Nov. 8, 2011, Thomas Ryan, "Handling of Subscription-Related Issues in a Media Consumption System", 10 pages.
Non-Final Office Action for U.S. Appl. No. 11/763,395, Thomas Ryan, "Providing Supplemental Information Based on Hints in a Media Consumption System", 10 pages.
Office action for U.S. Appl. No. 11/763,357 , mailed on Dec. 21, 2011, Reztlaff et al., "Obtaining and Verifying Search Indices", 14 pages.
Final Office Action for U.S. Appl. No. 11/763,363, mailed on Dec. 23, 2011, James R. Rezlaff II et al., "Search Results Generation and Sorting", 10 pages.
Non-Final Office Action for U.S. Appl. No. 11/763,369, mailed on Dec. 29, 2011, James R. Reztlaff II et al., "Search of Multiple Content Sources on a User Device", 21 pages.
Final Office Action for U.S. Appl. No. 11/693,685, dated Dec. 8, 2011, John Lattyak et al., "Relative Progress and Event Indicators", 23 pages.
Non-Final Office Action for U.S. Appl. No. 11/763,358, mailed on Sep. 12, 2011, James R. Retzlaff II, "Managing Status of Search Index Generation", 11 pages.
Final Office Action for U.S. Appl. No. 11/963,618, mailed on Sep. 26, 2011, Michael Rykov, "Dissemination of Periodical Samples", 15 pages.
Non-Final Office Action for U.S. Appl. No. 11/763,374, mailed on Sep. 27,2011, Thomas Ryan, "Consumption of Items via a User Device", 17 pages.
Translated Chinese Office Action mailed Aug. 3, 2012 for Chinese patent application No. 200880025056.5, a counterpart foreign application of U.S. Appl. No. 11/763,374, 17 pages.
Translated Chinese Office Action mailed Sep. 24, 2012 for Chinese patent application No. 200880017259.X, a counterpart foreign application of U.S. Appl. No. 11/693,682, 5 pages.

(56) References Cited

OTHER PUBLICATIONS

Final Office Action for U.S. Appl. No. 12/414,914, mailed on Jan. 4, 2012, 16 pgs.
Office action for U.S. Appl. No. 11/763,374 mailed on Oct. 16, 2012, Ryan et al, "Consumption of Items via a User Device", 13 pages.
Office action for U.S. Appl. No. 13/083,445, mailed on Oct. 5, 2012, Siegel et al., "Method and System for Providing Annotations of a Digital Work", 29 pages.
Final Office Action for U.S. Appl. No 11/763,374, mailed on Feb. 13, 2012, Thomas Ryan et al., "Consumption of Items via a User Device", 14 pages.
Non-Final Office Action for U.S. Appl. No. 11/763,393, mailed on Feb. 16, 2012, John Lattyak et al., "Incremental Updates of Items", 24 pages.
Final Office Action for U.S. Appl. No. 12/360,089, mailed on Mar. 28, 2012, Tom Killalea et al., "Aggregation of Highlights", 17 pages.
Non-Final Office Action for U.S. Appl. No. 12/366,941, mailed on Mar. 30, 2012, Scott Dixon et al., "Bundled Digital Content", 12 pages.
Translated Chinese Office Action mailed May 17, 2012 for Chinese patent application No. 20078004873.9 a counterpart foreign application of US patent No. 7,865,817, 5 pages.
Translated Chinese Office Action mailed May 21, 2012 for Chinese patent application No. 20078004873.9, a counterpart foreign application of U.S. Appl. No. 11/763,369, 9 pages.
Office action for U.S. Appl. No. 11/693,682, mailed on Apr. 23, 2012, Siegel et al., "Providing Annotations of a Digital Work", 12 pages.
Final Office Action for U.S. Appl. No. 11/763,386, mailed on Apr. 26, 2012, Thomas Ryan et al., "Handling of Subscription-Related Issues in a Media Consumption System", 14 pages.
Non-Final Office Action for U.S. Appl. No. 13/083,445, mailed on May 4, 2012, Hilliard B. Siegel et al., "Method and System for Providing Annotations of a Digital Work", 20 pages.
Final Office Action for U.S. Appl. No. 11/763,395, mailed May 9, 2012, Thomas Ryan et al., "Providing Supplemental Information Based on Hints in a Media Consumption System", 12 pages.
Office action for U.S. Appl. No. 11/763,390, mailed on Jun. 27, 2012, Bajaj et al., "Providing User-Supplied Items to a User Device", 7 pages.
Office action for U.S. Appl. No. 11/763,392, mailed on Jun. 27, 2012, Ryan et al., "Administrative Tasks in a Media Consumption System", 47 pages.
On-Final Office Action for U.S. Appl. No. 12/943,211, mailed on Jun. 6, 2012, James. R. Retzlaff II et al., "Obtaining and Verifying Search Indices", 10 pages.
Non-Final Office Action for U.S. Appl. No. 11/763,369 mailed on Jun. 7, 2012, James R. Reztlaff II et al., "Search of Multiple Content Sources on a User Device", 20 pages.
Canadian Office Action mailed Jul. 6, 2012 for Canadian patent application No. 2594573, a counterpart foreign application of US patent application No. 8,131,647, 5 pages.
Translated Japanese Office mailed Oct. 12, 2012 for Japanese patent application No. 2009-544304, a counterpart foreign application of US patent No. 7,865,817, 6 pages.
Translated Japanese Office Action mailed Sep. 18, 2012 for Japanese patent application No. 2007-552235, a counterpart foreign application of US patent No. 8,131,647, 4 pages.
Office action for U.S. Appl. No. 11/693,685, mailed on Aug. 15, 2013, Lattyak et al., "Relative Progress and Event Indicators", 24 pages.
US Pat. Pub. No. 2004081300 dated Apr. 29, 2004, corresponds to Japanese Patent Application Laid-open No. 2002-259718, 14 pages.
US Patent No. 7,340,436 dated Mar. 4, 2008, corresponds to Japanese Patent Application Laid-open No. 2003-513384, 7 pages.
Translated Chinese Office Action mailed Dec. 13, 2012 for Chinese patent application No. 20078004873.9, a counterpart foreign application of US patent No. 7,865,817, 4 pages.
Translated Chinese Office Action mailed Dec. 14, 2012 for Chinese patent application No. 200880017589.9, a counterpart foreign application of U.S. Appl. No. 11/763,369, 8 pages.

Translated Chinese Office Aciton mailed Feb. 1, 2013 for Chinese patent application No. 200880025056.5, a counterpart foreign application of U.S. Appl. No. 11/763,374, 19 pages.
Chinese Office Action mailed Jun. 28, 2013 for Chinese patent application No. 20078004873.9, a counterpart foreign application of US patent application No. 7,865,817, 4 pages.
Translated Chinese Office Action mailed Jun. 6, 2013 for Chinese patent application No. 201080006308.7, a counterpart foreign application of US patent No. 8,378,979, 13 pages.
Translated Chinese Office Action mailed Jul. 10, 2013 for Chinese patent application No. 200880025056.5, a counterpart foreign application of U.S. Appl. No. 11/763,377, 8 pages.
European Office Action mailed Jun. 10, 2013 for European patent application No. 06718773.2, a counterpart foreign application of U.S. Appl. No. 11/693,682, 6 pages.
Goodreads.com, "About goodreads", 2006, 2 pages.
Translated Japanese Office Action mailed Dec. 17, 2012 for Japanese patent application No. 2010-509529, a counterpart foreign application of U.S. Appl. No. 11/763,374, 7 pages.
Translated Japanese Office Action mailed Dec. 7, 2012 for Japanese patent application No. 2010-501124, a counterpart foreign application of U.S. Appl. No. 11/693,682, 6 pages.
Translated Japanese Office Action mailed Apr. 12, 2013 for Japanese patent application No. 2010-501125, a counterpart foreign application of U.S. Appl. No. 11/763,369, 5 pages.
Translated Japanese Office Action mailed May 24, 2013 for Japanese patent application No. 2010-501124, a counterpart foreign application of U.S. Appl. No. 11/693,682, 7 pages.
Translated Japanese Office Action mailed May 31, 2013 for Japanese patent application No. 2010-509529, a counterpart foreign application of U.S. Appl. No. 11/763,374, 5 pages.
Translated Japanese Office Action mailed Aug. 23, 2013 for Japanese patent application No. 2009-544304, a counterpart foreign application of US patent No. 7,865,817, 4 pages.
Office action for U.S. Appl. No. 12/943,211, mailed on Feb. 6, 2013, Reztlaff, II et al., "Obtaining and Verifying Search Indices", 9 pages.
Office action for U.S. Appl. No. 11/763,392, mailed on Feb. 14, 2013, Ryan et al., "Administrative Tasks in a Media Consumption System", 47 pages.
Office action for U.S. Appl. No. 13/294,803, mailed on Feb. 21, 2013, Inventor #1, "Progress Indication for a Digital Work", 76 pages.
Office action for U.S. Appl. No. 11/763,386, mailed on Feb. 28, 2013, Ryan et al., "Handling of Subscription-Related Issues in a Media Consumption System", 17 pages.
Office action for U.S. Appl. No. 11/763,374, mailed on Apr. 22, 2013, Ryan et al., "Consumption of Items via a User Device", 17 pages.
Office action for U.S. Appl. No. 11/763,390, mailed on Apr. 8, 2013, Bajaj et al, "Providing User-Supplied Items to a User Device", 7 pages.
Office action for U.S. Appl. No. 11/763,369, mailed on May 14, 2013, Reztlaff, II et al., "Search of Multiple Content Sources on a User Device", 24 pages.
Office action for U.S. Appl. No. 11/763,395, mailed on May 2, 2013,Ryan et al., "Providing Supplemental Information Based on Hints in a Media Consumption System", 12 pages.
Office action for U.S. Appl. No. 13/294,803, mailed on Jun 4, 2013, Lattyak et al., "Progress Indication for a Digital Work", 26 pages.
Office action for U.S. Appl. No. 12/759,828, mailed on Jun. 6, 2013, Reztlaff, II et al., "Search and Indexing on a User Device", 27 pages.
Office action for U.S. Appl. 11/693,685, mailed on Aug. 15, 2013, Lattyak et al., "Relative Progress and Event Indicators", 24 pages.
Office action for U.S. Appl. No. 11/763,376, mailed on Aug. 19, 2013, Kiraly et al., "Notification of a User Device to Perform an Action", 16 pages.
Office action for U.S. Appl. No. 11/537,484, mailed on Aug. 27, 2013, Ryan, "Expedited Acquisition of a Digital Item Following a Sample Presentation of the Item", 13 pages.
Office action for U.S. Appl. No. 12/414,914, mailed on Sep. 13, 2013, Agarwal et al, "Questions on Highlighted Passages", 35 pages.
Final Office Action for U.S. Appl. No. 11/763,369, mailed on Sep. 16, 2013, James R. Reztlaff II et al., "Search of Multiple Content Sources on a User Device", 23 pages.

(56) References Cited

OTHER PUBLICATIONS

Office Action for U.S. Appl. No. 13/294,803, mailed on Sep. 24, 2013, John Lattyak, "Progress Indication for a Digital Work", 27 pages.
Office action for U.S. Appl. No. 13/722,961, mailed on Sep. 5, 2013, Lattyak et al., "Delivery of Items for Consumption by a User Device", 6 pages.
Oki et al., "The Infomation Bus—An Architecture for Extensive Distributed Systems", ACM, 1993, 11 pages.
Palm Reader Handbook, Palm Inc., 2000, 56 pages.
International Search Report mailed Sep. 9, 2008, in International Application No. PCT/US08/64387, filed May 21, 2008, 1 page.
Translated Chinese Office Action mailed Nov. 5, 2013 for Chinese patent application No. 200880025056.5, a counterpart foreign application of U.S. Appl. No. 11/763,374, 15 pages.
Final Office Action for U.S. Appl. No. 11/763,395, mailed on Oct. 30, 2013, Thomas A. Ryan, "Providing Supplemental Information Based on Hints in a Media Consumption System", 14 pages.
Office action for U.S. Appl. No. 11/763,386, mailed on Oct. 16, 2013, Ryan et al., "Handling of Subscription-Related Issues in a Media Consumption System",18 pages.
Office Action for U.S. Appl. No. 12/943,211, mailed on Oct. 8, 2013, "Obtaining and Verifying Search Indices", 9 pages.
Canadian Office Action mailed May 29, 2014 for Canadian patent application No. 2684580, a counterpart foreign application of U.S. Appl. No. 11/763,374, 3 pages.
Translated Chinese Office Action mailed Feb. 25, 2014 for Chinese patent application No. 200880025056.5 , a counterpart foreign application of U.S. Appl. No. 11/763,374, 13 pages.
Translated Chinese Office Action mailed Jan. 6, 2014 for Chinese patent application No. 201080006308.7, a counterpart foreign application of US patent No. 8,378,979, 12 pages.
Chinese Office Action mailed Jun. 5, 2014 for Chinese patent application No. 201080006308.7, a counterpart foreign application of US patent No. 8,378,979, 9 pages.
European Office Action mailed Apr. 7, 2014 for European patent application No. 06718773.2, a counterpart foreign application of US patent No. 8,131,647, 7 pages.
Final Office Action for U.S. Appl. No. 12/414,914, mailed on Feb. 10, 2014, Amit D. Agarwal, "Questions on Highlighted Passages", 40 pages.
Homer, et al., "Instant HTML", Wrox Press, 1997, pp. 76-79.
Translated Japanese Office Action mailed Jan. 14, 2014 for Japanese patent application No. 2011-548210, a counterpart foreign application of US patent No. 8,378,979, 4 pages.
Office Action for U.S. Appl. No. 11/537,518, mailed on Feb. 14, 2014, John Lattyak, "Acquisition of an Item Based on a Catalog Presentation of Items", 14 pages.
Office Action for U.S. Appl. No. 11/763,314, mailed on Mar. 10, 2014, Craig S. Griffin, "Display Dependent Markup Language", 42 pages.
Office action for U.S. Appl. No. 12/366,941, mailed on Mar. 14, 2014, Dixon et al., "Bundled Digital Content", 13 pages.
Final Office Action for U.S. Appl. No. 11/693,685, mailed on Mar. 24, 2014, John Lattyak, "Relative Progress and Event Indicators", 26 pages.
Office Action for U.S. Appl. No. 11/763,357, mailed on Mar. 27, 2014, James R. Retzlaff II, "Obtaining and Verifying Search Indices", 14 pages.
Office Action for U.S. Appl. No. 13/722,961, mailed on Apr. 25, 2014, John Lattyak, "Delivery of Items for Consumption by a User Device", 4 pages.
Final Office Action for U.S. Appl. No. 11/763,374, mailed on May 14, 2014, Thomas A. Ryan, "Consumption of Items via a User Device", 21 pages.
Final Office Action for U.S. Appl. No. 12/759,828, mailed on May 2, 2014, James R. Retzlaff II, "Search and Indexing on a User Device", 27 pages.

Office Action for U.S. Appl. No. 13/959,589, mailed on Jun. 2, 2014, Thomas A. Ryan, "Administrative Tasks in a Media Consumption System", 24 pages.
Office action for U.S. Appl. No. 13/284,446, mailed on Jun. 24, 2014, Hansen, "Indicators for Navigating Digital Works", 19 pages.
Office Action for U.S. Appl. No. 12/949,115, mailed on Jun. 4, 2014, Thomas A. Ryan, "Invariant Referencing in Digital Works", 11 pages.
Office action for U.S. Appl. No. 12/943,211, mailed on Jul. 2, 2014, Retzlaff, II et al., "Obtaining and Verifying Search Indices", 9 pages.
"Trilogy Definition", Merriam-Webster's Collegiate Dictionary, Tenth Edition, 1999, 2 pages.
Translated Japanese Office Action mailed Nov. 12, 2013 for Japanese patent application No. 2010-501125, a counterpart foreign application of U.S. Appl. No. 11/763,369, 9 pages.
"Mastering to Become a True Manager, Well-selected commands for an efficient event log management, Part 1," Windows Server World, vol. 9, No. 2, pp. 86-96, IDG Japan, Japan, Feb. 1, 2004.
Office Action for U.S. Appl. No. 12/759,828, mailed on Dec. 17, 2013, James R. Retzlaff II, "Search and Indexing on a User Device", 25 pages.
Office Action for U.S. Appl. No. 11/763,374, mailed on Dec. 24, 2013, Thomas A. Ryan, "Consumption of Items via a User Device", 16 pages.
Canadian Office Action mailed Aug. 14, 2014 for Canadian patent application No. 2684955, a counterpart foreign application of U.S. Appl. No. 11/693,682, 3 pages.
Translated Chinese Office Action mailed Jun. 16, 2014 for Chinese patent application No. 200880025056.5, a counterpart foreign application of U.S. Appl. No. 11/763,374, 18 pages.
Barnes & Noble, "Nook User Guide", retrieved from the Internet Feb 5, 2013, 120 Pages.
Kindle Community, Discussions—Screen Saver, retrieved from the Internet on Nov. 06, 2009 at <<http://www.amazon.com/tag/kindle/forum?cdForum=Fx1D7SY3BVSESG
&cdThread=Tx28QGUBE29L22J>>, 4 Pages.
"Kobo Wireless eReader & Desktop Application User Guide", Feb 2011, 170 Pages.
Office Action for U.S. Appl. No. 12/886,877, mailed on Jan. 15, 2015, Gilles Jean Roger Belin, "Cover Display", 45 Pages.
Office Action for U.S. Appl. No. 12/886,877, mailed on Feb. 21, 2014, Gilles Jean Roger Belin, "Cover Display", 36 Pages.
Office Action for U.S. Appl. No. 13/070,328, mailed on Feb. 25, 2014, Sailesh Rachabathuni, "Last Screen Rendering for Electronic Book Readers", 11 Pages.
Office action for U.S. Appl. No. 12/567,984, mailed on Mar. 15, 2013, Kim, "Last Screen Rendering for Electronic Book Readern", 10 Pages.
Office action for U.S. Appl. No. 13/070,328, mailed on 7/25/13, Rachabathuni, "Last Screen Rendering for Electronic Book Readers", 11 Pages.
Office action for U.S. Appl. No. 13/070,328, mailed on Aug. 12, 2014, Rachabathuni, "Last Screen Rendering for Electronic Book Readers", 6 Pages.
Office action for U.S. Appl. No. 12/886,877, mailed on 8/13/14, Belin et al., "Cover Display", 40 Pages.
Office action for U.S. Appl. No. 12/886,877, mailed on Sep. 11, 2013, Belin et al., "Cover Display", 31 Pages.
Non-Final Office Action for U.S. Appl. No. 12/567,984, mailed on Sep. 27, 2012, John T. Kim, "Last Screen Rendering for Electronic Book Reader", 9 Pages.
Copy of the Canadian Office Action mailed Dec. 15, 2014 for Canadian patent application No. 2681754, a counterpart foreign application of U.S. Appl. No. 11/763,369, 5 Pages.
Copy of the Mintues of the Oral Proceedings mailed on Nov. 27, 2014 for European patent application No. 06718773.2, a counterpart foreign application of U.S. Appl. No. 8,131,647, 13 Pages.
Copy of the European Office Action mailed Sep. 23, 2014 for European patent application No. 08732668.2, a counterpart foreign application of U.S. Appl. No. 11/763,369, 7 Pages.
Copy of the European Office Action mailed Nov. 27, 2014 for European patent application No. 06718773.2, a counterpart foreign application of U.S. Appl. No. 8,131,647, 31 Pages.

(56) References Cited

OTHER PUBLICATIONS

Malloy, et al., "Google Search", retrieved on Sep. 17, 2014 at <<http://en.wikipedia.org/w/index.php?title=GoogleSearch&oldid=118323867>>, Wikipedia, the free encyclopedia, Mar. 27, 2007, 6 Pages.

Translated Copy of the Japanese Office Action mailed Sep. 2, 2014 for Japanese patent application No. 2011-548210, a counterpart foreign application of U.S. Appl. No. 12/360,744, 4 Pages.

Translated Copy of the Japanese Office Action mailed Dec. 16, 2014 for Japanese patent application No. 2009-544304, a counterpart foreign application of U.S. Appl. No. 11/693,677, 2 Pages.

Translated copy of the Japanese Office Action mailed Aug. 5, 2014 for Japanese patent application No. 2010-501125, a counterpart foreign application of U.S. Appl. No. 11/763,369, 7 Pages.

Translated copy of the Korean Office Action mailed Dec. 19, 2014 for Korean patent application No. Oct. 2009-7024280, a counterpart foreign application of U.S. Appl. No. 11/763,374, 10 Pages.

Office Action for U.S. Appl. No. 12/366,941, mailed on Jan. 6, 2015, Scott Dixon, "Bundled Digital Content", 15 Pages.

Final Office Action for U.S. Appl. No. 11/537,518, mailed on Jan. 9, 2015, John Lattyak, "Acquisition of an Item Based on a Catalog Presentation of Items", 13 Pages.

Office Action for U.S. Appl. 13/722,961, mailed on Oct. 10, 2014, John Lattyak, "Delivery of Items for Consumption by a User Device", 8 Pages.

Final Office Action for U.S. Appl. No. 13/284,446, mailed on Oct. 31, 2014, Linsey R. Hansen, "Indicators for Navigating Digital Works", 17 Pages.

Office Action from the U.S. Patent and Trademark Office for Application U.S. Appl. No. 11/763,378, mailed on Oct. 6, 2014, Lattyak et al., "Transfer of Instructions to a User Device ", 16 Pages.

Office Action for U.S. Appl. No. 11/693,682, mailed on Oct. 7, 2014, Siegel et al., "Providing Annotations of a Digital Work", 12 Pages.

Final Office Action for U.S. Appl. No. 13/959,589, mailed on Nov. 6, 2014, Thomas A. Ryan, "Administrative Tasks in a Media Consumption System", 29 Pages.

Office action for U.S. Appl. No. 11/763,314, mailed on Aug. 28, 2014, Griffin et al., "Display Dependent Markup Language", 52 Pages.

Office action for U.S. Appl. No. 13/083,445, mailed on Sep. 24, 2014, Siegel et al., "Method and System for Providing Annotations of a Digital Work", 31 Pages.

Office action for U.S. Appl. No. 11/537,518, mailed on 9/4/14, Lattyak, "Acquisition of an Item Based on a Catalog Presentation of Items", 10 Pages.

Final Office Action for U.S. Appl. No. 11/763,378, mailed on Feb. 05, 2015, John Lattyak, "Transfer of Instructions to a User Device", 21 Pages.

Office Action for U.S. Appl. No. 13/959,589, mailed on Feb. 26, 2015, Thomas A. Ryan, "Administrative Tasks in a Media Consumption System", 45 Pages.

Copy of the Canadian Office Action mailed Mar. 30, 2015 for Canadian patent application No. 2688002, a counterpart foreign application of U.S. Appl. No. 11/763,358, 5 Pages.

Translated copy of the Chinese Office Action mailed Mar. 30, 2015 for Chinese patent application No. 200880017589.9, a counterpart foreign application of U.S. Appl. No. 11/763,369, 10 Pages.

Copy of the Japanese Office Action mailed Mar. 10, 2015 for Japanese patent application No. 2010-501125, a counterpart foreign application of U.S. Appl. No. 11/763,369, 19 Pages.

Final Office Action for U.S. Appl. No. 12/943,211, mailed on Apr. 24, 2015, James R. Retzlaff II, "Obtaining and Verifying Search Indices", 10 Pages.

\* cited by examiner

700 SIMPLE ELIMINATION
(CONTINUED)

INTERVALS DATA AFTER FILTERING 702

| USER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | 4 | | | 5 | | | | | | | | 3 | | | | | | |
| B | 4 | | | 4 | | | | | | | | | 3 | | | | | |
| C | | 6 | | | 4 | | | | | | | | | | | | | |
| D | | | | | | | | | | | | | | | | | | |

INTERVAL DATA AFTER INTERVALS SELECTED 704

| USER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | | | | | | | | | | | | 3 | | | | | | |
| B | | | | | | | | | | | | | | | | | | |
| C | | 6 | | | 4 | | | | | | | | | | | | | |
| D | | | | | | | | | | | | | | | | | | |

Fig. 7

800 TRUNCATION ELIMINATION

INITIAL RAW HIGHLIGHT INTERVAL DATA 802

| USER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | | | | | | | | | | | | | | | | | | |
| B | | | | | | | | | | | | | | | | | | |
| C | | | | | | | | | | | | | | | | | | |
| D | | | | | | | | | | | | | | | | | | |

INTERVAL DATA AFTER INITIALIZATION AND COMPUTATION OF OVERLAPPING INTERVALS 804

| USER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | 4 | | | 5 | | | | | | 3 | | 3 | | | | 2 | | |
| B | 4 | | | 4 | | | | 3 | | 3 | | | 3 | | | | | |
| C | | 6 | | | | | 4 | | | | | | | | | | | |
| D | | | | | | | 13 | | | | | | | | | | | |

Fig. 8

900 TRUNCATION ELIMINATION (CONTINUED)

INTERVAL DATA AFTER FILTERING 902

| USER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A |   | 4 |   |   | 5 |   |   |   |   |    |    |    | 3  |    |    |    |    |    |
| B |   | 4 |   |   | 4 |   |   |   |   |    |    |    | 3  |    |    |    |    |    |
| C |   |   | 6 |   |   |   | 4 |   |   |    |    |    |    |    |    |    |    |    |
| D |   |   |   |   |   |   |   |   |   |    |    |    |    |    |    |    |    |    |

INTERVAL DATA AFTER INTERVALS SELECTED 904

| USER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A |   |   |   |   | 5 |   |   |   |   |    |    |    |    |    |    |    |    |    |
| B |   |   |   |   |   |   |   |   |   |    |    |    | 3  |    |    |    |    |    |
| C |   |   | 6 |   |   |   | 4 |   |   |    |    |    |    |    |    |    |    |    |
| D |   |   |   |   |   |   |   |   |   |    |    |    |    |    |    |    |    |    |

Fig. 9

1000 ELEMENTARY INTERVAL ACCRETION

INITIAL RAW HIGHLIGHT INTERVAL DATA 1002

| USER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | | | | | | | | | | | | | | | | | | |
| B | | | | | | | | | | | | | | | | | | |
| C | | | | | | | | | | | | | | | | | | |
| D | | | | | | | | | | | | | | | | | | |

INTERVAL DATA AFTER INITIALIZATION AND COMPUTATION OF OVERLAPPING INTERVALS 1004

| USER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| ALL USERS | 4 | 2 | 4 | 3 | 3 | 2 | 3 | 1 | 3 | 1 | 2 | 3 | | 1 | 2 | | | |

INTERVAL DATA AFTER ELEMENTARY INTERVALS ARE CHOSEN IN SORTED ORDER 1006

| USER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| ALL USERS | 4 | 2 | 4 | | 3 | | 3 | | 3 | | 2 | 3 | | 1 | 2 | | | |

INTERVAL DATA AFTER INTERVALS SELECTED 1008

| USER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| ALL USERS | 4 | | | 4 | | 3 | | 3 | | 3 | | | 3 | | | | | |

Fig. 10

1100 ELIMINATION/ELEMENTARY INTERVAL HYBRID

INITIAL RAW HIGHLIGHT INTERVAL DATA 1102

| USER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | | | | | | | | | | | | | | | | | | |
| B | | | | | | | | | | | | | | | | | | |
| C | | | | | | | | | | | | | | | | | | |
| D | | | | | | | | | | | | | | | | | | |

INTERVAL DATA AFTER INITIALIZATION AND COMPUTATION OF OVERLAPPING ELEMENTARY INTERVALS 1104

| USER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| ALL USERS | 4 | 2 | 4 | 3 | 3 | 2 | 3 | 1 | 3 | 1 | 2 | 3 | 3 | 1 | 2 | | | |

INTERVAL DATA AFTER ELEMENTARY INTERVALS NOT MEETING MINIMUM HIGHLIGHT CRITERIA HAVE BEEN EXTRACTED, INTERVALS TO BE TRUNCATED 1106

| USER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| ALL USERS | | | 2 | | | | 2 | | 1 | | 1 | 2 | | | 1 | 2 | | |

Fig. 11

1200 ELIMINATION/ELEMENTARY INTERVAL HYBRID (CONTINUED)

INTERVAL DATA AFTER ELEMENTARY INTERVALS HAVE BEEN COMPARED AGAINST THE ORIGINAL DISCRETE INTERVALS, AND ANY INTERVALS THAT OVERLAP AN ELEMENTARY INTERVAL ARE BROKEN/TRUNCATED 1202

| USER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | | | | | | | | | | | | | | | | | | |
| B | | | | | | | | | | | | | | | | | | |
| C | | | | | | | | | | | | | | | | | | |
| D | | | | | | | | | | | | | | | | | | |

INTERVAL DATA AFTER COMPUTATION OF OVERLAPPING INTERVALS 1204

| USER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | 4 | | | 5 | | | | | | 3 | | | 3 | | | | | |
| B | 4 | | | 4 | | | | 3 | | 3 | | | 3 | | | | | |
| C | 4 | | | 4 | | 3 | | 3 | | | | | | | | | | |
| D | 4 | | | 5 | | | | 3 | | 3 | | | 3 | | | | | |

Fig. 12

1300 ELIMINATION/ELEMENTARY
INTERVAL HYBRID (CONTINUED)

INTERVAL DATA AFTER DROPPING INTERVALS NOT MEETING MINIMUM/MAXIMUM LENGTH
CRITERIA 1302

| USER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | 4 | 4 |   | 5 | 5 | 5 |   |   |   |    |    |    | 3  | 3  |    |    |    |    |
| B | 4 |   |   | 4 |   |   |   |   |   |    |    |    | 3  |    |    |    |    |    |
| C | 4 |   |   |   |   |   |   |   |   |    |    |    |    |    |    |    |    |    |
| D | 4 |   |   | 5 | 5 |   |   |   |   |    |    |    | 3  |    |    |    |    |    |

INTERVAL DATA AFTER CHOOSING INTERVALS IN DESCENDING ORDER OF NUMBER OF
OVERLAPS 1304

| USER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | 4 | 4 |   | 5 | 5 | 5 |   |   |   |    |    |    |    |    |    |    |    |    |
| B |   |   |   |   |   |   |   |   |   |    |    |    |    |    |    |    |    |    |
| C |   |   |   |   |   |   |   |   |   |    |    |    |    |    |    |    |    |    |
| D |   |   |   |   |   |   |   |   |   |    |    |    + 3  |    |    |    |    |    |

Fig. 13

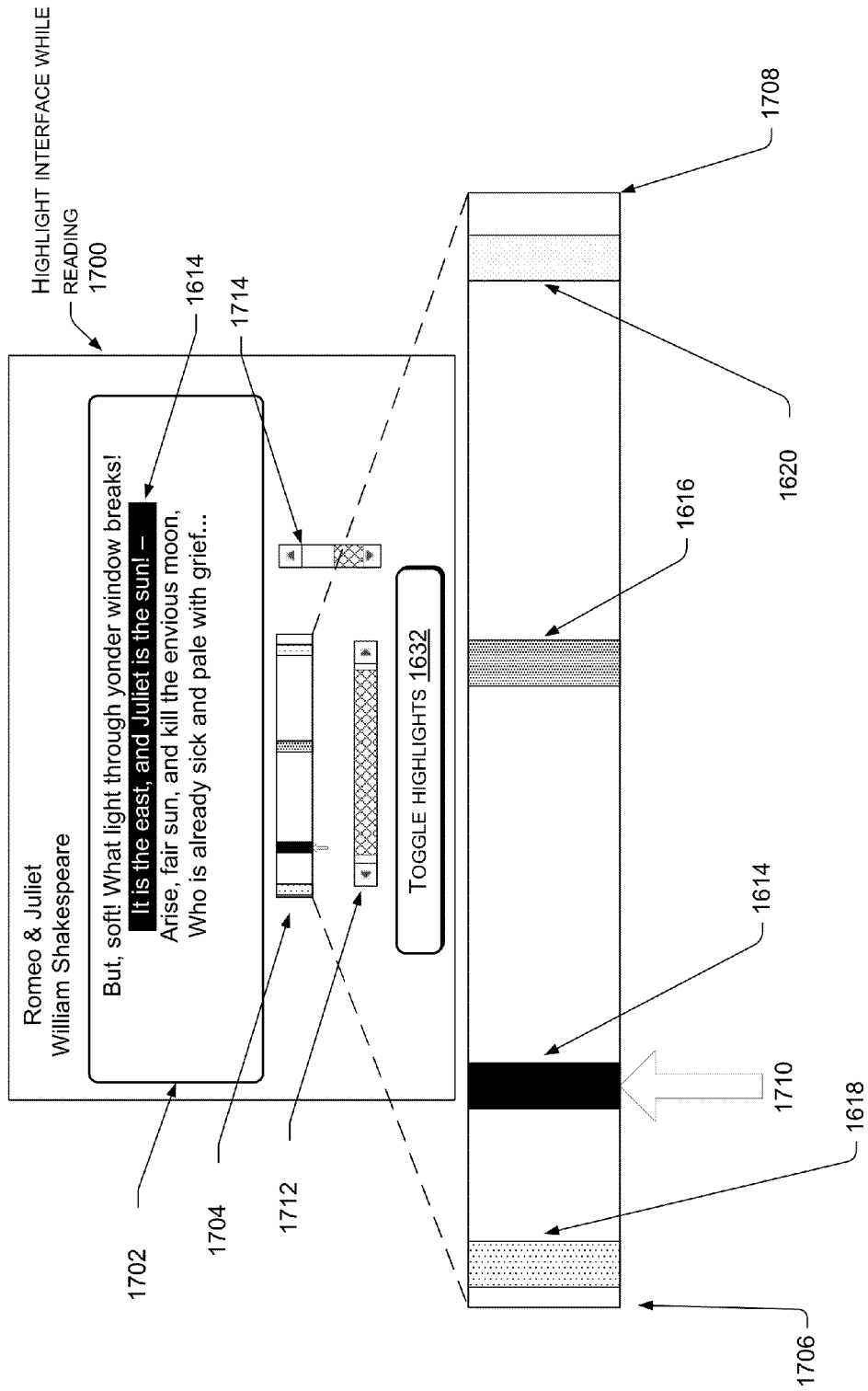

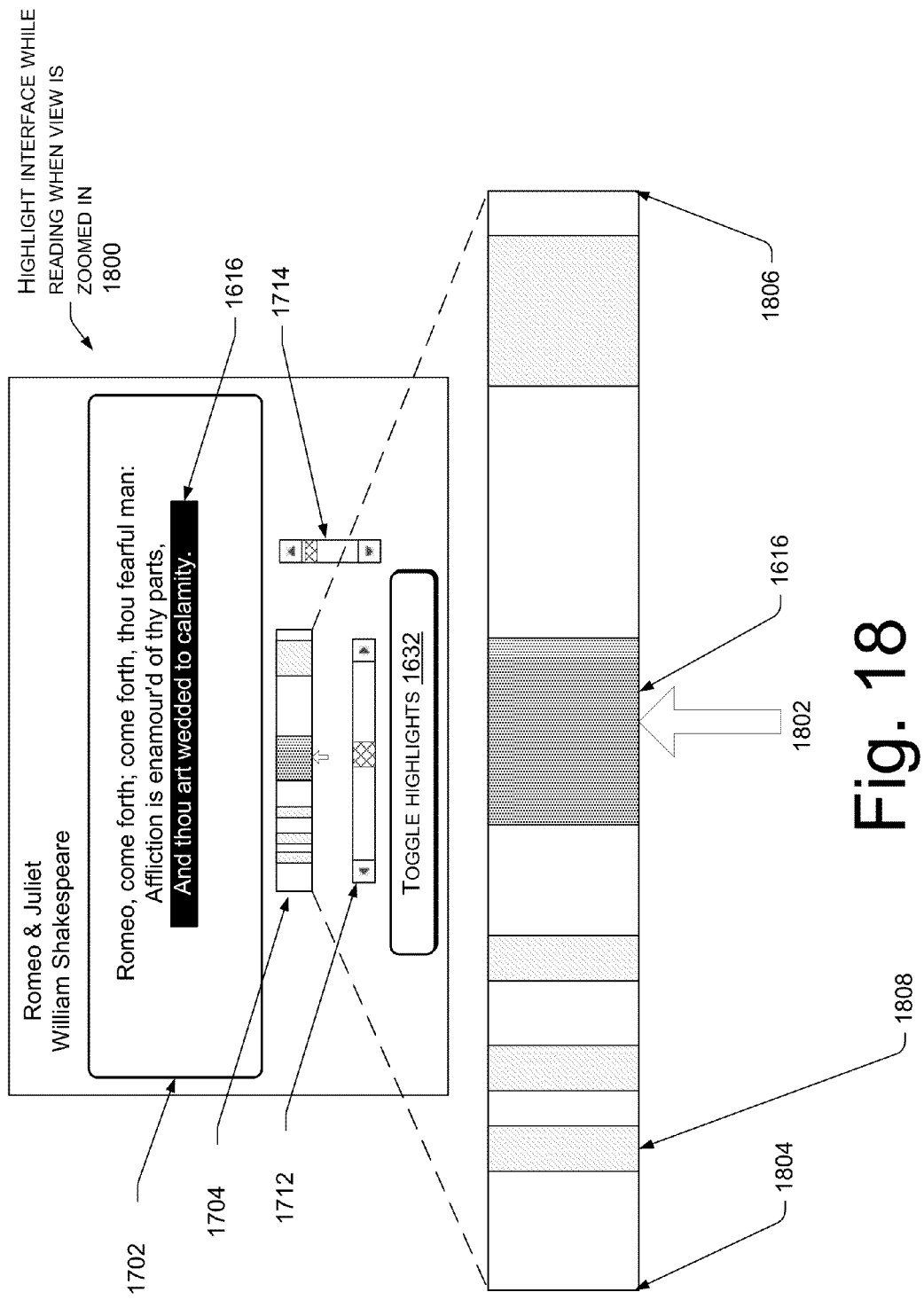

AGGREGATION OF HIGHLIGHTS

BACKGROUND

Electronic devices such as electronic book readers ("e-book readers"), cellular telephones, personal digital assistant (PDA), portable media players, tablet computers, netbooks, and the like, may display digital works such as electronic books or other electronic media content to a user. Users may include purchasers of the electronic media, prospective purchasers of the electronic media, or other consumers, for example, library patrons. As the quantity of available electronic media content continues grow, filtering of and providing access to portions of electronic media content considered relevant to users and communities of users has become more desirable. Such access may function as a community-driven reputation system for passages in the work, and may render information more easily accessible and further encourage sales of electronic media content.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 7 is a chart depicting a remaining portion of selection of highlight intervals using the simple elimination process of FIG. 6

FIG. 8 is a chart depicting initial portions of selection of highlight intervals using a truncation elimination process.

FIG. 9 is a chart depicting a remaining portion of selection of highlight intervals using the truncation elimination process of FIG. 8.

FIG. 10 is a chart depicting selection of highlight intervals using an elementary interval accretion.

FIG. 11 is a chart depicting initial portions of selection of highlight intervals using an elimination/elementary interval hybrid.

FIG. 12 is a chart depicting additional portions of the selection of highlight intervals using the elimination/elementary interval hybrid of FIG. 11.

FIG. 13 is a chart depicting a remaining portion of selection of highlight intervals using the elimination/elementary interval hybrid of FIG. 11.

FIG. 17 depicts an illustrative highlight user interface while viewing text in an electronic book.

FIG. 18 depicts the illustrative highlight user interface of FIG. 17, while viewing another highlighted passage.

DETAILED DESCRIPTION

Figure 1:
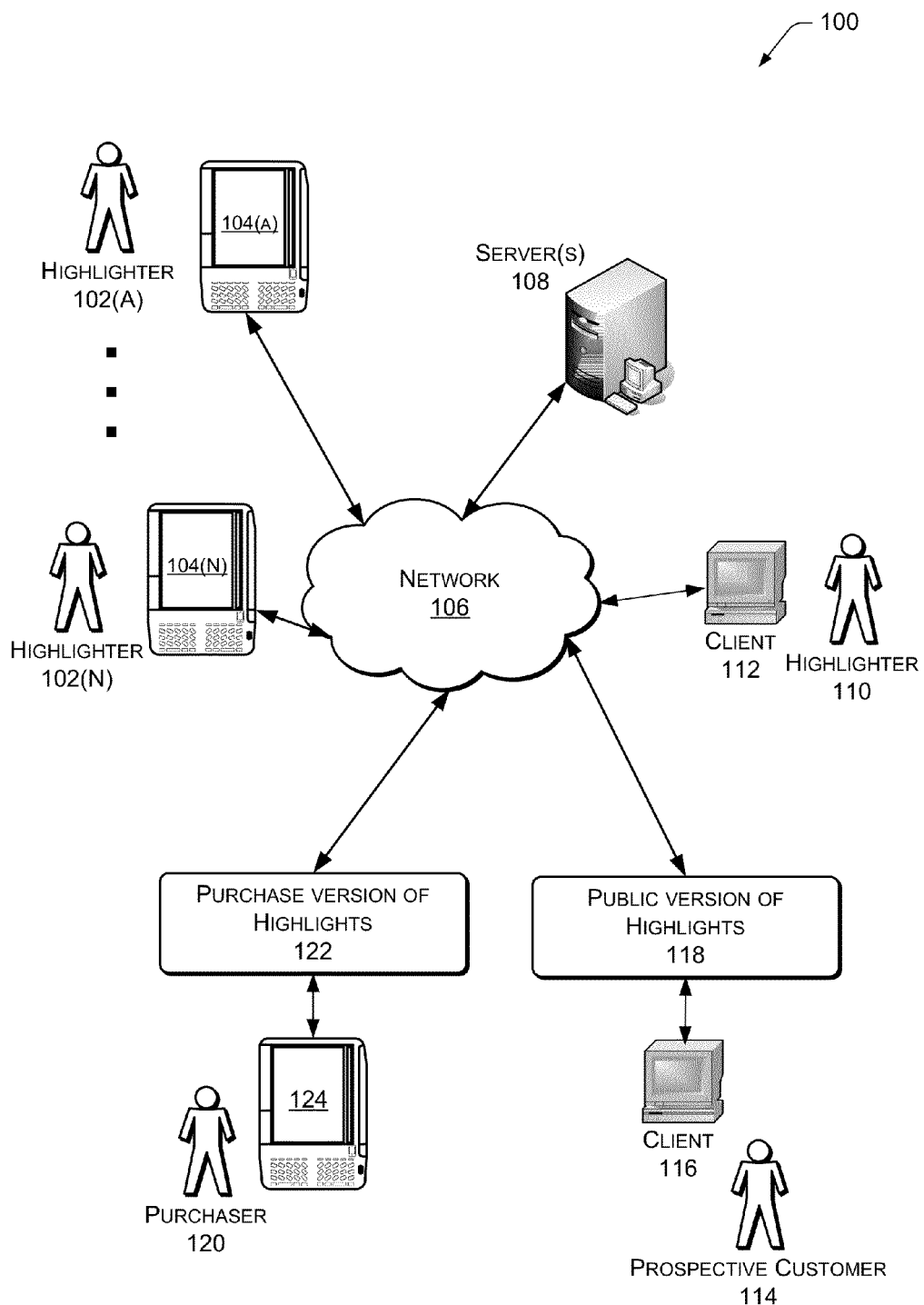
FIG. 1 is a schematic diagram of an illustrative network incorporating aggregated highlighting to provide public and purchased versions of highlights to users.

As described above, as the quantity of digital works has grown, providing access to portions of electronic media content considered relevant to users has become more difficult. Facilitating such access for users may render information more easily accessible and further encourage sales of and use of a digital work.

This disclosure describes aggregation of highlights, in which commonly highlighted sections of digital works are identified and may be made available to the public and/or purchasers of the digital work. Users comprising a "community" may highlight a digital work. The community may also comprise those who view but do not create highlights. "Highlighting," as used herein, is the selection of a portion of a digital work, considered to be of interest or relevance by a user. Highlights may either be made by a user selected portion, automatically by monitoring usage characteristics such as dwell time on a portion, physical highlights taken from a scanned physical document, etc. Highlights taken from scanned physical documents may be characterized by the nature of the highlight, i.e., different color highlights or underlining of a passage. These different characteristics of highlights in physical documents may be determined to represent different levels of importance, different individual highlighters, or a combination of these. Highlights from multiple users may be aggregated, leading to a "Wisdom of Crowds" effect where a selection of highlights by many may be more relevant or useful than highlights selected by a small number of users.

In one example, a server receives and consolidates these highlights. Minimum and/or maximum lengths for individual highlights or other thresholds may be pre-determined or dynamically adjusted. For example, non-fiction programming books might have a minimum highlight length greater than that of a fiction work. Thresholds may also be determined on the fly, taking into account some book-specific heuristics. For example, a book with a low Flesch-Kincaid readability score may have a minimum highlight length set lower than one a work with a high Flesch-Kincaid readability score. Where multiple versions or editions of a book are highlighted, highlights may be synchronized across versions. The server then determines the most commonly highlighted sections of the digital work and selects aggregated highlights corresponding to those sections according to one or more selection rules. The server may create a public version of aggregated highlights for a digital work and/or a purchase version. For example, the purchase version may be available for some remuneration, and provide more extensive or lengthy highlights than the public version. For instance, prospective customers or current licensees of a digital work may view the public version of the aggregated highlights to determine if a digital work is indeed what they wish to purchase. Likewise, a user with a license to consume a digital work may purchase the aggregated highlights. To protect rights of a digital work's owner, a maximum threshold for the quantity of a digital work displayed as aggregated highlights may be limited.

Once collected, a highlight user interface (HUI) may visually present aggregated highlights to a user on an electronic device. The HUI may indicate aggregated highlights and their relative ranking, for example, using different colors and/or intensities of color. Highlights may be displayed as a graph, with the relative height of each bar indicating a frequency for each elementary interval in the digital work. For example, the graph may be bar, line, or histogram style. A user may navigate through the digital work by selecting aggregated highlights presented in the HUI. In addition to the aggregated highlights, the HUI may present highlights entered by the user of the electronic device. The HUI could also present highlights entered by other users who have either have a particular role or significance (e.g., the author) or who have a particular relationship to the user. Statistics comparing the user's highlights with those of other users or communities may also be presented. For example, a user may see that a portion they have highlighted was also highlighted by 80% of the members of a community.

While aggregated highlighting is described in the context of highlighting textual content, the concepts described herein are also applicable to highlighting of sections of other digital works, such as audio recordings, video recordings, or the like. Also, while processes are described as being implemented using eBook reader devices, digital works may be highlighted and/or displayed by electronic devices of an eBook other than eBook reader devices, such as cellular telephones, PDAs, portable media players, tablet computers, netbooks, notebooks, desktop computers, and the like.

Aggregated Highlighting

FIG. 1 is an illustrative network 100 incorporating aggregated highlighting to provide public and purchased versions of highlights to users. A user who adds highlights to a digital work is a "highlighter." Illustrated are several highlighters, 102(A) through 102(N). Each highlighter 102 may highlight their respective copies of a digital work, or a commonly accessible single copy, via a device such as an eBook reader 104. Each user may have a device 104, indicated 104(A) through 104(N). The eBook reader 104 may communicate via a network 106 to a server 108. Network 106 may comprise the Internet, a cable television network, wireless network, wired network, wireless wide area network, etc. Server 108 may comprise a single server, cluster of servers, data center, etc.

Additionally or alternatively, a highlighter 110 may use a client 112 to highlight a digital work. The client 112 may comprise a personal computer, laptop, netbook, PDA, or other device capable of displaying a digital work, highlighting the digital work, and communicating those highlights to server 108 via network 106. Highlighter 110 has access rights to the digital work being highlighted, but may or may not have possessory rights. For example, a patron in a library may be permitted to highlight a digital work, but not access the digital work from their home.

A prospective customer 114 may use a client 116 to view a public version of aggregated highlights 118 for a digital work. The transfer of highlights may be initiated by device 104 (as a "pull" of data), by the server 108 (as a "push" of data), or a combination. The public version of aggregated highlights 118 may comprise a selected subset of highlights available for the digital work. This subset may have maximum size limitations, or content limitations. For example, a public version of the aggregated highlights may provide no more than a predetermined percentage (e.g., two percent) of a body of the digital work to comply with conditions set forth by the owner of intellectual property rights in the digital work. Alternatively, the owner of the digital work may choose to opt out of aggregated highlighting altogether.

In another example, aggregated highlights from a portion of a digital work may not be made public. For example, highlights in a last chapter of a mystery novel where a solution is presented may not be displayed, or be hidden until clicking to view a "spoiler" highlight. Prospective customer 114 may view the public version of the aggregated highlights 118 and decide that the digital work is of sufficient interest to warrant purchase or otherwise gain access to the digital work.

A purchaser 120 of a digital work, for example an electronic book, may acquire a purchase version of aggregated highlights 122 to view on their device 124. As above, the transfer of highlights may be initiated by device 104 (as a "pull" of data), by the server 108 (as a "push" of data), or a combination. This purchase version may contain the entire repertoire of aggregated highlights available, which have been selected as described below. For example, the purchaser 110 of the purchase version of aggregated highlights 122 would have access to view the highlights in the last chapter of the mystery novel described above. Additionally, the purchase version of the aggregated highlights 122 may not be subject to the same predetermined highlighting limit (e.g., two percent) as the public version. As above, a user may choose to not display hidden highlights, such as "spoilers," unless selected.

Figure 2:
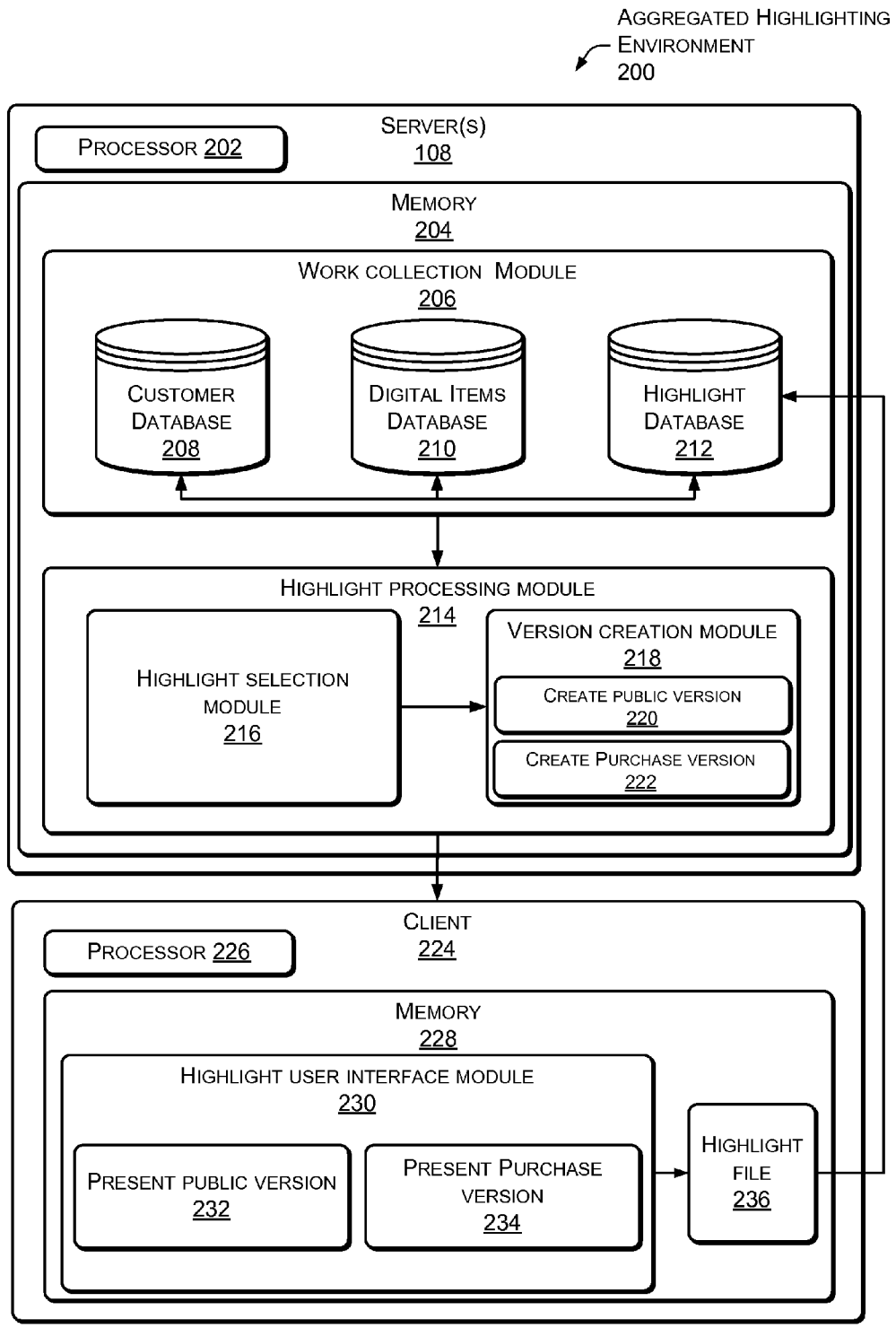
FIG. 2 is a schematic diagram of an illustrative aggregated highlighting environment.

FIG. 2 is a schematic diagram of an illustrative aggregated highlighting environment 200. The highlighting environment 200 includes one or more servers 108, comprising a processor 202 and memory 204. Memory 204 may include computer-readable storage media as described below. Stored in memory 204 is a digital work collection module 206. The digital work collection module 206 may comprise a customer database 208, a digital items database 210, and a highlight database 212, coupled to one another.

The customer database 208 comprises information about users participating in the community. The digital items database 210 comprises digital works themselves, for example music, books, movies, etc. Digital works may be accessed in common. That is, each user with access to a particular work may access a common copy of that item, or each user may access their own discrete copy of an item stored in a digital locker. The highlight database 212 may comprise highlighted intervals of a digital work, a version or edition number of the digital work which the highlights are for, etc.

A highlight processing module 214 is also present within memory 204 and coupled to digital work collection module 206. The highlight processing module 214 comprises a highlight selection module 216 and a version creation module 218. The highlight processing module 214 processes highlights from highlighters to create versions of aggregated highlights for use by the community. The version creation module 218 may create different versions of aggregated highlights for distribution or use, such as a public version 220 and a purchase version 222. As described above, a public version 220 may comprise a subset of highlights available in the purchase version 222.

The highlight processing module 214 is in communication with a client 224. Client 224 may comprise a processor 226 and memory 228. Memory may include computer-readable storage media as described below. Stored in memory 228 is a highlight user interface (HUI) module 230. The HUI module 230 may present a public version 232 of aggregated highlights or a purchase version 234 of aggregated highlights stored in memory 228, as retrieved from server 108, depending on highlight viewing rights the user may have. Additionally, a user of the client 224 may have highlight submission rights, allowing the user to submit highlights to the server 108 for inclusion in the highlight database 212. When a user has highlighting rights, a highlight file 236 may be created when highlights are made of the digital work on the client 224. The highlight file 236 stored in memory 228 may be provided to server 108 for incorporation into highlight database 212.

Selecting Highlights

Figure 3:
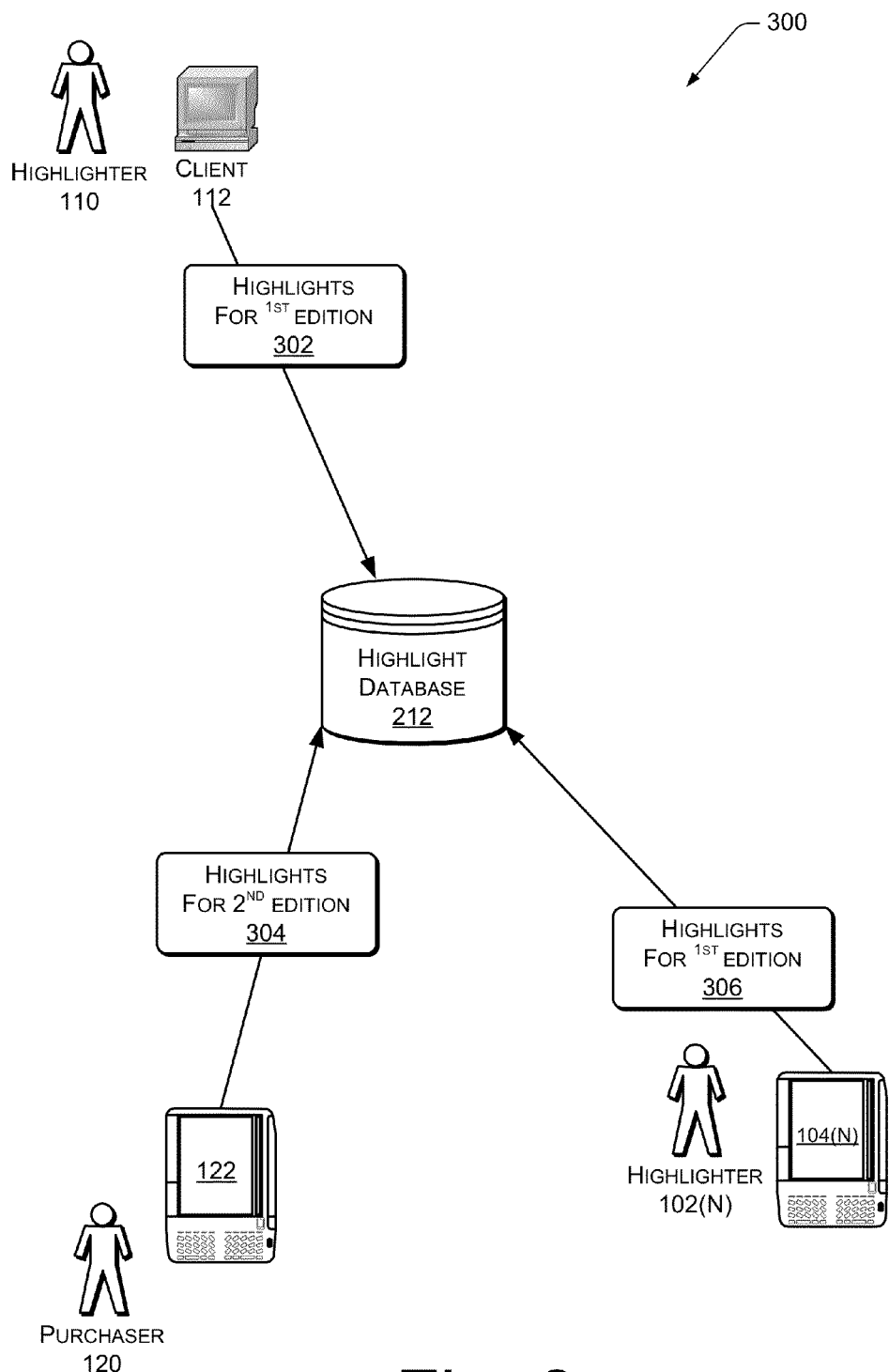
FIG. 3 is a schematic diagram of users contributing highlights from different versions or editions of the same digital work to a highlight database.

FIG. 3 is a schematic diagram of users contributing 300 highlights from different versions or editions of the same digital work to a highlight database. A highlighter 110 using client 112 may provide highlights for a first edition 302 of a digital work to highlight database 212. Highlighter 110 may be a patron accessing the digital work from a library. A purchaser 120 using device 122 may provide highlights for a second edition 304 of the digital work to the highlight database 212. Highlighter 102(N) using device 104(N) may provide highlights for a first edition 306 to the highlight database 212. Client 112 and devices 122 and 104(N) may provide the highlights to server 108 using network 106 and highlight file 236, as described above.

Highlights for the various editions are stored in highlight database 212. As described below, these highlights may be reconciled across the various editions.

Figure 4:
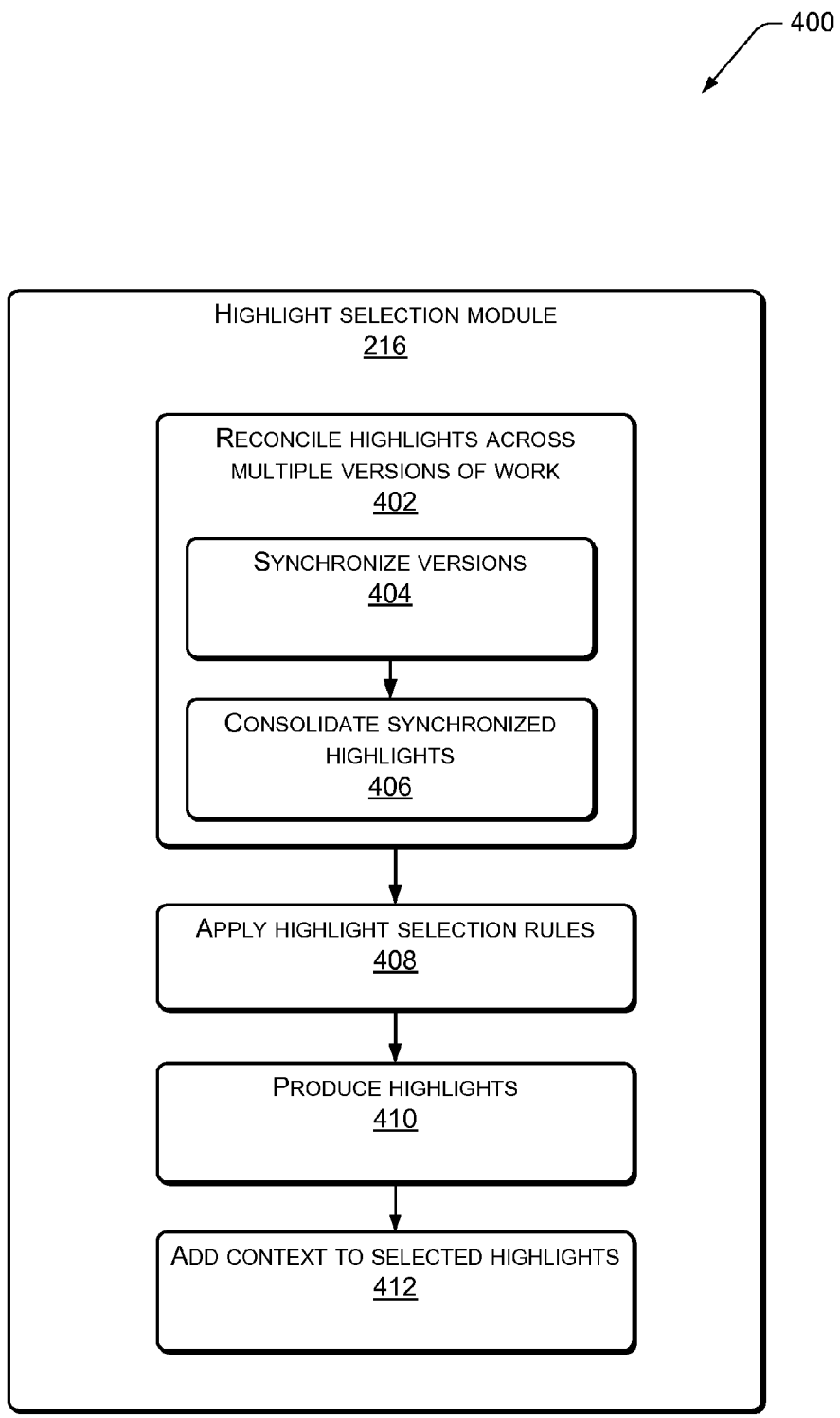
FIG. 4 is a flow diagram of an illustrative process of selecting highlights from a highlight database.

FIG. 4 is a flow diagram of an illustrative process 400 of selecting aggregated highlights from a highlight database including highlights of different versions of a digital work, using highlight selection module 216.

At 402, highlights across multiple versions of a digital work are reconciled, when they are present. Reconciliation may comprise synchronization of versions 404 and consolidating the synchronized highlights 406. To aid synchronization of versions 404, a reference database (not shown) is provided that includes the multiple versions of the digital work, including a reference version of a digital work, for example, a first edition of a book. Internal reference points, for example chapter headings or individual words in an electronic book, may be used to align the multiple versions. Reconciliation may take place on a per-highlight basis. For example, if the contents of one highlight matches another highlight, the two may be reconciled as equivalent. Highlights may also be reconciled using statistically improbable phrases.

At 408, highlight selection rules, described below, are applied to the available highlights to create selected highlights. However, highlights may encompass more than the portion of the digital work of interest to the user. In an electronic book, for example, the e-book reader or other display device may constrain the user to highlight only entire lines of displayed text, rather than individual characters or words. Thus, a user may select more than the desired text when highlighting a phrase beginning in the middle of one highlighted line and ending in the middle of the next highlighted line. In this example, the resulting highlight incorporates the end of an earlier phrase and the beginning of the following phrase, which may not be relevant to the user. Where desired, a phrase breaking or detection process may be used to provide context comprising adjacent text preceding and/or following highlighted text. Thus a phrase breaking or detection process may strip out the incomplete phrases, leaving the modified highlight for further processing. Alternatively, the processing could provide the remainder of the phrase before and of the phrase after, and could optionally indicate for example through display mechanisms which part was included in the highlight and which was in the preceding phrase. The mechanisms for such a display could include but are not limited to hyperlinked ellipses, arrows, or text of different color or different background.

A phrase breaking or detection process may look to punctuation, spacing, capitalization, or a dictionary of words, etc. to determine when a phrase ends in an electronic book. Digital works comprising other formats, such as audio or video may incorporate a portion breaking or detection process using silence in an audio track, changes between video frames, metadata markers in the digital work, etc. to determine when a particular portion ends.

At 410, the selected highlights are produced and may be stored, displayed to a user, etc. In some implementations, these highlight selection rules may incorporate filters to remove attribution information of a particular highlight to a particular user, remove highlights which are not made by a minimum threshold of users, and so forth. However, highlights from a specially defined user, for example an author of a digital work, a professor or other educator, celebrity, etc, may be incorporated into highlights ultimately presented to the community, or viewed as separate highlights. A user may then toggle or otherwise select to view their own personal highlights, community highlights, highlights from the specially defined user, from other users who have read similar books, from others in the same geographic area, etc., or combinations thereof.

Highlights may then have contextual information, or context. Context may comprise portions of a work before and/or after selected highlights. At 412, context is added to the highlights. For example, where the digital work is an electronic book, context may be sentences immediately before and after the highlight. These sentences are added to the highlighted portion to create highlights with context.

Figure 5:
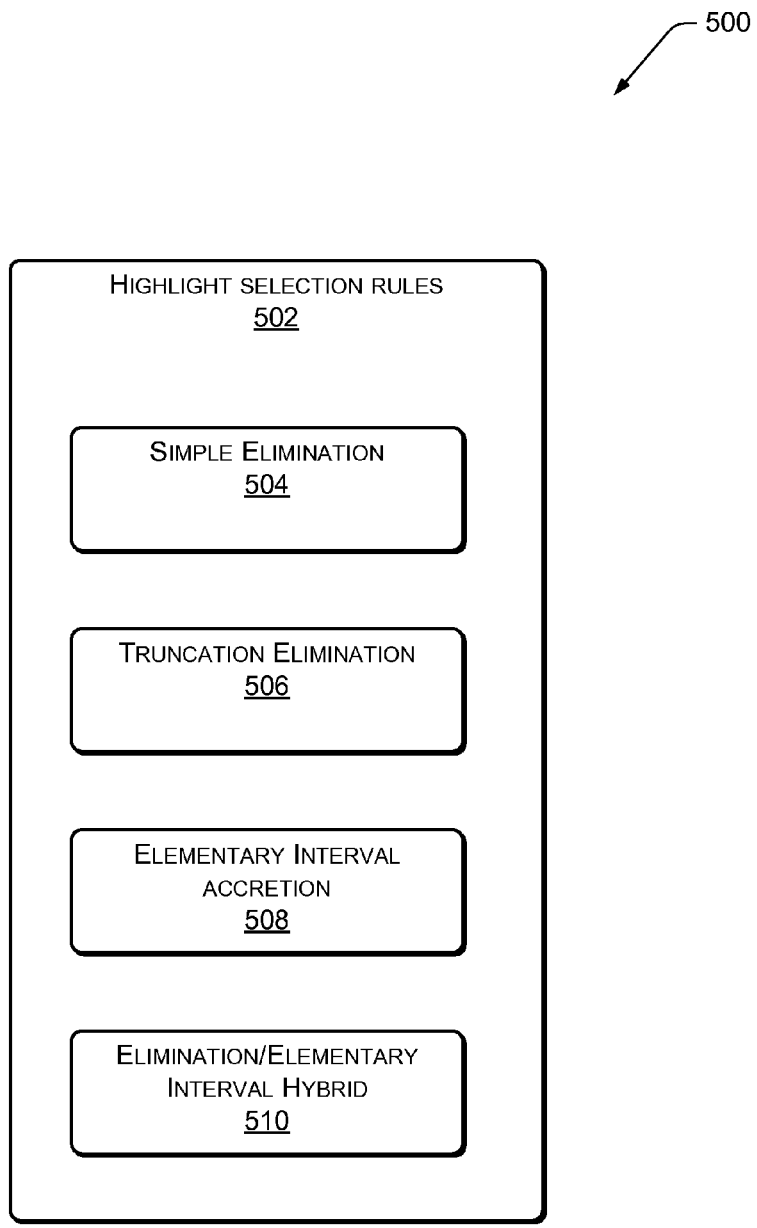
FIG. 5 is a schematic diagram depicting illustrative highlight selection rules.

FIG. 5 depicts illustrative highlight selection rules 500. These comprise simple elimination process 504, truncation elimination process 506, elementary interval accretion process 508, or elimination/elementary interval hybrid process 510. These highlight selection rules may be used separately or combined, and are discussed in more detail next.

Figure 6:
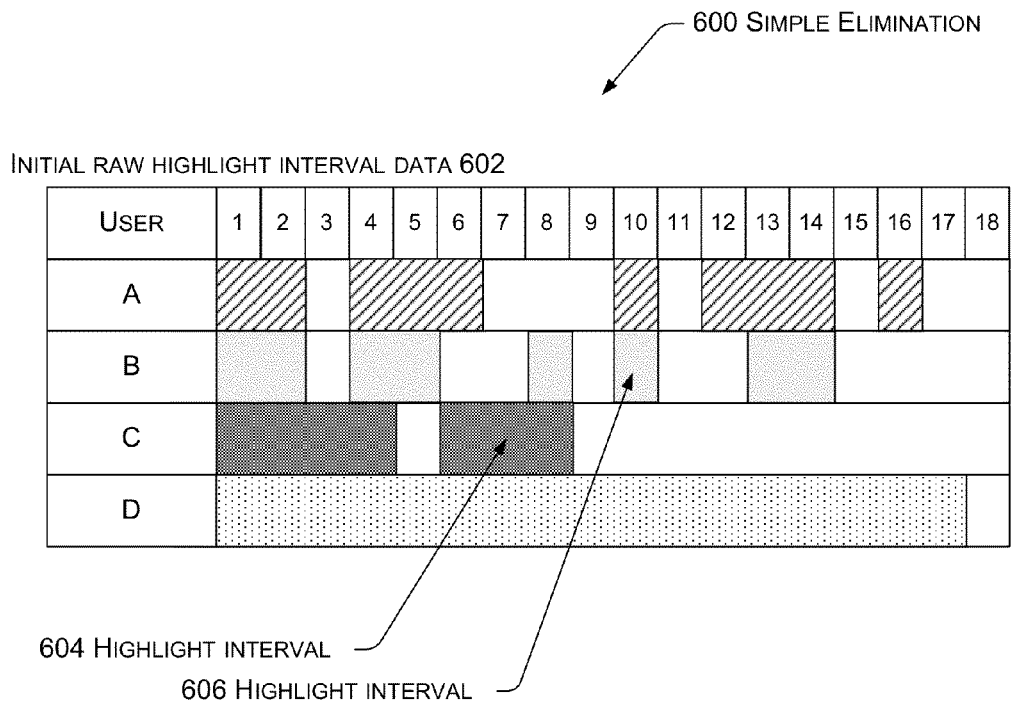
FIG. 6 is a chart depicting initial portions of selection of highlight intervals using a simple elimination process.

FIG. 6 depicts initial portions 600 of selection of highlight intervals using a simple elimination process 504, in which aggregated highlights are selected and intervals overlapping with the aggregated highlights are eliminated. A highlight comprises an interval across elements. In the case of textual works, elements may comprise characters, words, sentences, paragraphs, etc. In the case of audio, video, or other works, elements may additionally or alternatively include units of time, tracks, frames, area on a graphic (e.g., progress indicator), etc. Initial highlight data 602 input by individual users, or raw highlight data, are depicted for four users A, B, C, and D across 18 elements. In these illustrations, an interval is designated by the user, and spans across one or more elements. For example, highlight interval 604 is designated C(6-9) as it highlights elements 6, 7, 8 up to but not including element 9. Another example is highlight interval 606 designated B(10-11) as it highlights element 10 up to but not including element 11.

Depicted in this initial raw highlight interval data 602 are the following intervals:

A(1-3), A(4-7), A(10-11), A(12-15), A(16-17)
B(1-3), B(4-6), B(8-9), B(10-11), B(13-15)
C(1-5), C(6-9)
D(1-18)

As illustrated in FIG. 6, these highlight intervals have overlapping interval values computed, which are displayed here at 608. In these illustrations, the overlapping interval value is indicated 610 within each highlight interval. In this example, an overlapping interval value is computed by counting the intersections of overlapping highlights. For example, C(1-5) intersects 6 distinct intervals: A(1-3), B(1-3), itself C(1-5), D1-18, A(4-7), and B(4-6). A(4-7) intersects 5 intervals, the intervals comprising: itself A(4-7), B(4-6), C(1-5), and C(6-9). D(1-18) spans the entire set of elements, and so intersects 13 intervals including itself. One implementation uses an interval tree data structure.

The overlapping interval value may also be computed to include a source weight. The source weight may be tied to a particular highlighter or community of highlighters. For example, highlights from a digital work's author may be assigned a large source weight, giving each highlight by the author higher priority over highlights by others or even from an entire community of users.

Undesired highlight intervals may be removed next, leaving only desired highlight intervals. Undesired highlight intervals may include highlight intervals which are too long, for example those having a length greater than a pre-determined maximum length. Undesired highlight intervals may also include highlight intervals which are too short, for example those having a length less than a pre-determined minimum length. As described above, pre-determined minimum and maxima may be static or dynamic in response to highlight activity. In this example, the pre-determined maximum length is 16 and the pre-determined minimum length is 2. Thus, D(1-18) is removed as being too long (greater than 16) while A(10-11), B(10-11), and B(8-9) are removed for being too short (less than 2). While this example illustrates computing the overlapping interval value then removing undesired intervals, this order may be changed with the removing occurring before computing taking place.

FIG. 7 depicts the remaining portion 700 of selection of the highlight intervals using the simple elimination process of FIG. 6. After removing the undesired intervals, the desired intervals 702 remain having these intervals:

A(1-3), A(4-7), A(12-15)
B(1-3), B(4-6), B(13-15)
C(1-5), C(6-9)
D, none

The desired intervals are sorted in descending order by the overlapping interval value. Once sorted, a desired interval having the greatest number of overlapping intervals is selected, and desired intervals which overlap with the selected interval are eliminated. For example, C(1-5) is chosen first as it has the greatest overlapping interval value of 6. Intervals A(1-3), A(4-7), B(1-3) and B(4-6) are eliminated because they overlap with C(1-5). Interval C(6-9) is chosen next as it has the next highest overlapping interval value of 4. Note that A(4-7) having an overlapping interval value of 5 has previously been eliminated and is no longer in a set of desired intervals. A tie between A(12-15) and B(13-15) is present. In the case of a tie, an interval closer to a predetermined desired length may be selected. In this illustration, the predetermined desired length is 3. However, other predetermined desired lengths could alternatively be used. Thus, A(12-15) would be chosen and B(13-15) would be eliminated.

The intervals selected in the simple elimination method 600 of FIG. 6 are illustrated at 704 and are A(12-15), C(1-5), C(6-9).

FIG. 8 depicts initial portions of selection of highlight intervals using a truncation elimination 800 process, in which aggregated highlights are selected and intervals overlapping with the aggregated highlights are truncated to remove the overlap. As in FIG. 6, initial highlight data 802 input by individual users, or raw highlight data, are depicted for four users A, B, C, and D across 18 elements. Depicted in this initial highlight data 802 are the following intervals:

A(1-3), A(4-7), A(10-11), A(12-15), A(16-17)
B(1-3), B(4-6), B(8-9), B(10-11), B(13-15)
C(1-5), C(6-9)
D(1-18)

As above, initial highlight intervals have overlapping interval values computed and displayed here at 804. An overlapping interval value is computed by counting the intersections of overlapping highlights. For example, C(1-5) intersects 6 distinct intervals: A(1-3), B(1-3), itself C(1-5), D1-18, A(4-7), and B(4-6). A(4-7) intersects 5 intervals, the intervals comprising: itself A(4-7), B(4-6), C(1-5), and C(6-9). D(1-18) spans the entire set of elements, and so intersects 13 intervals including itself.

Undesired highlight intervals may be removed next, leaving only desired highlight intervals. Undesired highlight intervals may include highlight intervals which are too long, for example those having a length greater than a pre-determined maximum length. Undesired highlight intervals may also include highlight intervals which are too short, for example those having a length less than a pre-determined minimum length. In this example, assume the pre-determined maximum length is 16 and the pre-determined minimum length is 2. Thus, D(1-18) is removed as being too long (greater than 16) while A(10-11), B(10-11), and B(8-9) are removed for being too short (less than 2). While this example illustrates computing the overlapping interval value then removing undesired intervals, this order may be changed with the removing occurring before computing taking place.

FIG. 9 depicts the remaining portion 900 of selection of highlight intervals using the truncation elimination process of FIG. 8. After removing the undesired intervals, the desired intervals 902 remain having these intervals:

A(1-3), A(4-7), A(12-15)
B(1-3), B(4-6), B(13-15)
C(1-5), C(6-9)
D, none

Next, desired highlight intervals are sorted in descending order by the overlapping interval value. An overlap is detected between a first desired highlight interval and a subsequent desired highlight interval. When detected, the overlapping subsequent desired highlight interval is truncated to the nearest non-overlapping interval. Minimum length requirements may then be reapplied to filter out any intervals not meeting the length requirements.

For example, continuing with the intervals after filtering 902, the following occurs: C(1-5) is chosen first as it has an overlapping interval value of 6. A(1-3) and B(1-3) are contained within C(1-5) and thus eliminated. B(4-6) intersects C(1-5) and is, therefore, truncated and replaced with B(5-6). B(5-6) is below the pre-determined minimum length of 2, and is eliminated. A(4-7) intersects C(1-5) and is, therefore, truncated and replaced with A(5-7).

Chosen next is interval A(5-7). Interval A(5-7) has an overlapping interval value of 5. C(6-9) intersects A(5-7), thus C(6-9) is truncated and replaced with C(7-9).

Chosen next is interval C(7-9) with an overlapping interval value of 4. A two way tie between A(12-15) and B(13-15) occurs. In this example, there is a predetermined preference for highlights closer to a desired length. In this example, the desired length is 1. However, other predetermined preferences could alternatively be used. Thus, in this example, B(13-15) is chosen as it is smaller. A(12-15) is truncated and replaced with A(12-13), and A(12-13) is then eliminated as it is below the pre-determined minimum length of 2.

The intervals selected in the truncation elimination method 800 of FIG. 8 are illustrated at 904 and are A(5-7), B(13-15), C(1-5), and C(7-9).

FIG. 10 depicts selection of highlight intervals 1000 using an elementary interval accretion, in which elementary intervals are generated, overlaps computed, the elementary intervals are sorted and chosen until a minimum threshold is reached, the resulting elementary intervals are merged with adjacent intervals until they meet or exceed a minimum size, and elementary intervals below a minimum threshold are removed. As in FIGS. 6 and 8, initial raw highlight interval data 1002 input by individual users, or raw highlight data, are depicted for four users A, B, C, and D across 18 elements. Depicted in this initial highlight interval 1002 are the following intervals:

A(1-3), A(4-7), A(10-11), A(12-15), A(16-17)
B(1-3), B(4-6), B(8-9), B(10-11), B(13-15)
C(1-5), C(6-9)
D(1-18)

Elementary highlight intervals comprising a start and an end point of all raw highlight intervals are generated. Elementary intervals may be generated by adding start and end values of all intervals to a list. The list is then sorted, and intervals are formed from the intervals in the list. For example, the sorted list of start and end values shown in 1002 would be 1, 3, 4, 5, 6, 7, 8, 9, 10, 11, 12, 13, 15, and 16. The following elementary intervals are then formed from pairs of start and end values: (1,3), (3-4), (4-5), (5-6), (6-7), (7-8), (8-9), (9-10), (10-11), (11-12), (12-13), (13-15), (15-16), and (16-18) (not shown) which has a value of 0, indicating no overlaps. As above, an overlapping interval value for the elementary highlight intervals is computed, and is shown at 1004. One implementation of computation includes inserting the original intervals into a data structure such as a segment tree.

Elementary highlight intervals are sorted in descending order by the overlapping interval value. Sorted elementary highlight intervals are then chosen. Choosing of elementary highlight intervals continues until reaching a predetermined highlight threshold. Chosen elementary highlight intervals are merged with adjacent intervals until the merged intervals meet or exceed a pre-determined minimum length, in this example 2.

In this illustration interval (1-3) is greater than the minimum length of 2 and retained. Interval (4-5) grows to (4-6). Interval (6-7) grows to (6-8). Interval (8-9) grows to (8-10) and interval (10-11) grows to (10-12). The resulting elementary intervals are shown at 1006. These intervals are (1-3), (3-4), (4-6), (6-8), (8-10), (10-12), (12-13), (13-15), and (16-17). Intervals (15-16) and (16-17) are not grown to meet the minimum size threshold as their overlapping interval values do not meet a minimum overlapping interval value threshold (OIVT), in this example the OIVT three. In another implementation, these intervals could be grown and then discarded in the next step.

Next, all un-chosen highlight intervals are discarded, such as those which are below the pre-determined minimum length of 2. Thus, (3-4) and (12-13), (15-16) and (16-17) are discarded in this example.

The intervals selected in the elementary interval accretion method 1000 are illustrated at 1008 and are (1-3), (4-6), (6-8), (8-10), and (13-15).

FIG. 11 depicts initial portions of selection of highlight intervals using an elimination/elementary interval hybrid 1100 process, which combines aspects of the processes shown in FIGS. 6, 7, and 10. As in FIGS. 6, 8, and 10, initial raw highlight interval data 1102 input by individual users, or raw highlight data, are depicted for four users A, B, C, and D across 18 elements. Depicted in this initial highlight interval 1102 are the following intervals:

A(1-3), A(4-7), A(10-11), A(12-15), A(16-17)
B(1-3), B(4-6), B(8-9), B(10-11), B(13-15)
C(1-5), C(6-9)
D(1-18)

As described above relative to FIG. 10, elementary highlight intervals from original discrete highlight intervals are generated. The initial highlight intervals of 1102 have overlapping interval values computed and displayed here at 1104. The intervals depicted in 1104 are: (1-3), (3-4), (4-5), (5-6), (6-7), (7-8), (8-9), (9-10), (10-11), (11-12), (12-13), (13-15), (15-16), and (16-17).

Next, as described previously, all elementary highlight intervals are removed that meet or exceed a minimum OIVT. In this example the minimum overlapping interval value is 3, thus (3-4), (7-8), (9-10), (11-12), (12-13), (15-16), and (17-18) are removed, with results displayed at 1106. These results are thus the intervals to be truncated, and comprise the following intervals: (3-4), (7-8), (9-10), (11-12), (12-13), (15-16), (16-17), and (17-18) with a value of zero indicating no overlaps. While this example illustrates computing the overlapping interval value then removing undesired intervals, this order may be changed with the removing occurring before computing taking place.

FIG. 12 depicts additional portions 1200 of selection of highlight intervals using the elimination/elementary interval hybrid of FIG. 11. Elementary highlight intervals are compared against original discrete highlight intervals. Any intervals overlapping an elementary interval which does not match certain criteria are truncated or eliminated. These criteria may include number of highlights, weight of highlights, etc.

In this illustration the following takes place with the intervals: C(1-5) is broken into C(1-3) and C(4-5). D(1-18) is broken into D(1-3) and D(4-18). C(6-9) is broken into C(6-7) and C(8-9). D(4-18) is broken into D(4-7) and D(8-18). D(8-18) is broken into D(8-9) and D(10-18). A(12-14) is truncated to A(13-14). D(10-18) is broken into D(10-11) and D(13-18). D(13-18) is broken into D(13-15) and D(16-18). A(16-17) and D(16-18) are discarded due to the truncation, as is (17-18) (not shown) which has a value of 0. This leaves the intervals depicted in 1202, which are:

A(1-3), A(4-7), A(10-11), A(13-15)
B(1-3), B(4-6), B(8-9), B(10-11), B(13-15)
C(1-3), C(4-5), C(6-7), C(8-9)
D(1-3), D(4-7), D(8-9), D(10-11), D(13-15).

An overlapping interval value for the elementary highlight intervals is computed and displayed at 1204.

FIG. 13 depicts the remaining portion of selection of highlight intervals 1300 using the elimination/elementary interval hybrid of FIG. 11. Intervals not meeting the pre-determined minimum length or pre-determined maximum length requirements are dropped. In this example, C(4-5), C(6-7), B(8-9), C(8-9), D(8-9), D(10-11), A(10-11), and B(10-11) are dropped. The resulting intervals are shown at 1302. These intervals are: A(1-3), A(4-7), A(13-15), B(1-3), B(4-6), B(13-15), C(1-3), D(1-3), D(4-7), D(13-15).

Next, a process similar to that of the simple elimination described above takes place. Desired highlight intervals result after removing undesired highlight intervals. As described above, undesired highlight intervals may be removed next, leaving only desired highlight intervals. Undesired highlight intervals may include highlight intervals which are too long, for example those having a length greater than a pre-determined maximum length. Undesired highlight intervals may also include highlight intervals which are too short, for example those having a length less than a pre-determined minimum length. In this example, the pre-determined maximum length is 16 and the pre-determined minimum length is 2.

The desired highlight intervals are sorted in descending order by the overlapping interval value, and highlight intervals which duplicate an existing desired highlight interval are eliminated. In this illustration the following occurs: A(4-7) and D(4-7) is in a tie, and A (4-7) may be chosen. The choice in the case of a tie may be randomly, or by pre-determined method, such as retaining the first value. Intervals D(4-7) B(4-6), C(4-5) (previously dropped), and C(6-7) (also previously dropped), are eliminated. A(1-3) is chosen next, eliminating B(1-3), C(1-3) and D(1-3). A(13-15), B(13-15), and D(13-15) are in a tie. In this tie, D(13-15) is randomly chosen. This eliminated A(13-15) and B(13-15).

The intervals selected in the elimination/elementary interval hybrid 1100 are illustrated at 1304, and are A(1-3), A(4-7), and D(13-15).

Creating Public and Purchase Highlights

Figure 14:
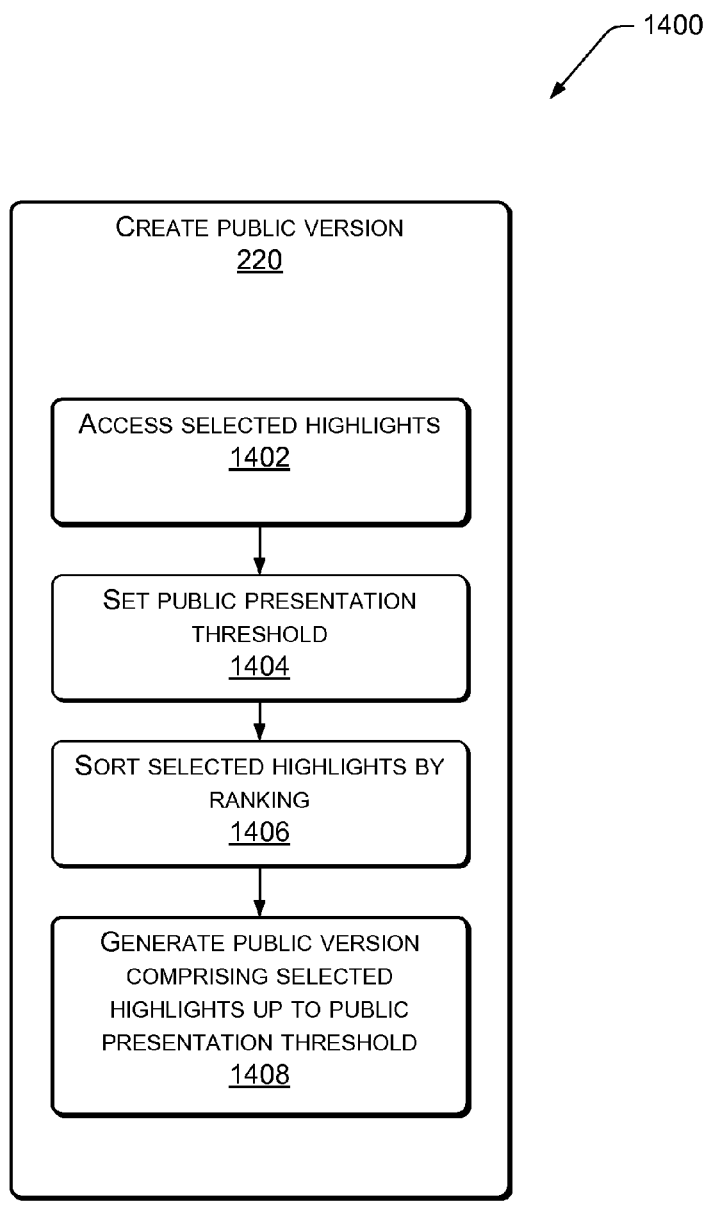
FIG. 14 is a flow diagram of an illustrative process of creating a public version of highlights from a highlight database.

FIG. 14 is a flow diagram of an illustrative process 1400 of creating a public version of aggregated highlights 220 from a highlight database. At 1402, selected highlights are accessed. At 1404, a public presentation threshold may be set. As described above, the public presentation threshold may comprise maximum size limitations such as a percentage of a body of the digital work, or content limitations such as excluding a particular section of a digital work. At 1406, selected highlights are sorted in descending order of ranking. At 1408, a public version is generated, the public version comprising selected highlights up to the public presentation threshold.

Figure 15:
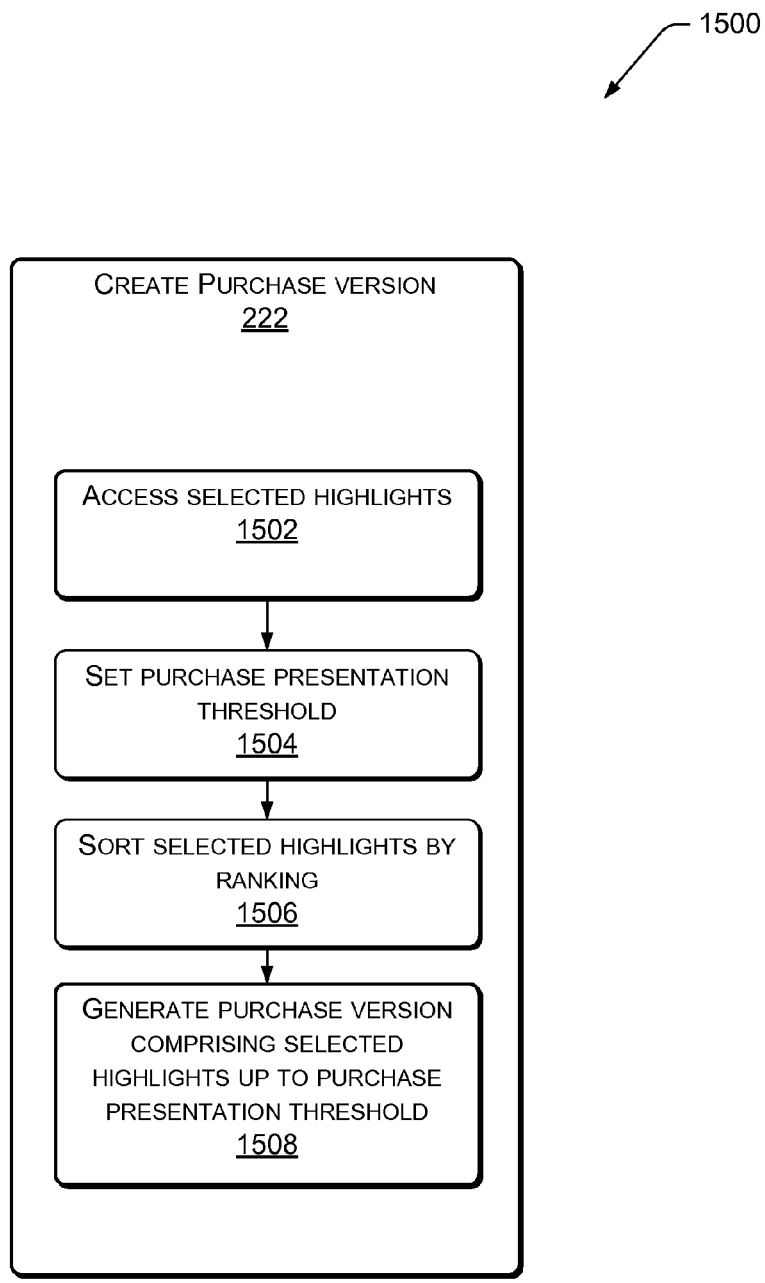
FIG. 15 is a flow diagram of an illustrative process of creating a purchase version of highlights from a highlight database.

FIG. 15 is a flow diagram of an illustrative process 1500 of creating a purchase version of aggregated highlights 222 from a highlight database. At 1502, selected highlights are accessed. At 1504, a purchase presentation threshold may be set. As described above, the purchase presentation threshold may comprise maximum size limitations such as a percentage of a body of the digital work, or content limitations such as excluding a particular section of a digital work. The purchase presentation threshold may be the same or different than the public presentation threshold. At 1506, selected highlights are sorted in descending order of ranking. At 1508, a purchase version is generated, the purchase version comprising selected highlights up to the purchase presentation threshold.

Displaying a Highlight User Interface (HUI)

Figure 16:
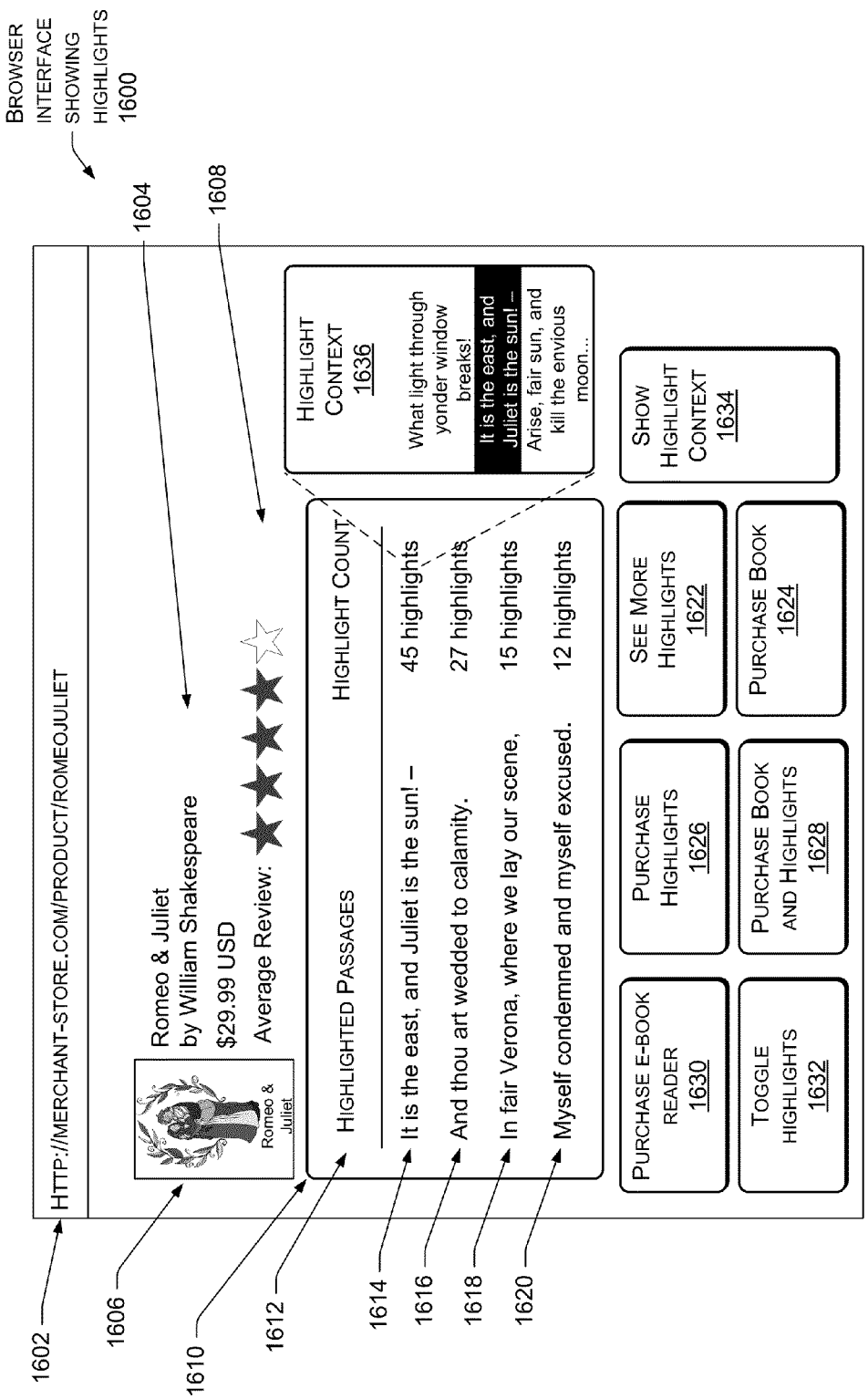
FIG. 16 depicts an illustrative browser interface showing highlights in an electronic book.

FIG. 16 depicts an illustrative browser interface 1600 showing highlights in an electronic book. A web address 1602 is shown in the browser interface to access an online merchant store selling books or aggregated highlights or both. Details about an illustrative book are presented to the user, including title, author, and price 1604. A thumbnail picture of the book's cover 1606 is also shown. An indication of user reviews of the book 1608 may also be presented.

A highlight viewing interface 1610 may present highlighted passages in a selected digital work. An indication of the highlighted passages 1612 and a highlight count may also be presented to the user. Instead of the highlight count, the HUI may display a metric pertaining to the highlight. For example, the metric may be order of appearance in the digital work, a page on which the passage appears, a count of the number of people who highlighted the particular passage displayed, or location within a work such as chapter, page, section, etc.

Displayed aggregated highlights may be sorted by the metrics pertaining to the aggregated highlights. In this illustration, highlighted passages are sorted in descending order of highlight count or frequency. For example, Passage 1614 "it is the east, and Juliet is the sun!" has been highlighted 45 times, and is listed at the top. Passage 1616 "and thou art wedded to calamity" has been highlighted 27 times and is listed next. Passage 1618 "in fair Verona, where we lay our scene" has been highlighted 15 times and is below passage 1616. Passage 1620 "myself condemned and myself excused" has been highlighted 12 times and is at the bottom of the list presented here.

Buttons to see more highlights 1622, purchase the book 1624, to purchase highlights 1626, to purchase the book and highlights 1628, purchase an e-book reader 1630, toggle highlights 1632, or show highlight context 1634 may also be presented to a user. Presentation of these buttons may be conditional based on the device used to access the digital work. For example, if a user is accessing this interface from an electronic book, they may be presented with the buttons to see more highlights 1622, purchase book 1624 with a single click, or purchase book and highlights 1628 with a single click. When a user has been determined to not have an e-book reader, the user may be presented with an option to purchase an e-book reader 1630. An additional option is a button to purchase the e-book reader, the digital work being displayed, and/or highlights with a single click.

The toggle highlights 1632 button allows a user to select displayed highlights. For example, a user may toggle to view only their personal highlights, highlights from others in their community, highlights from a community of all users, highlights from a person having a particular role or significance (e.g., the author), to show or hide highlights which contains spoilers, etc. Alternately, the user may be presented with a list, set of checkboxes, or other element presenting which highlights to display.

The show highlight context 1634 button allows presentation to the user of additional context comprising portions of the work surrounding the highlight. This additional context may be displayed as a highlight context 1636 pop-up, in this case illustrating the sentences before and after highlight 1614.

Where a user views a digital work in the interface which is not available in electronic form, highlighted passages may not be available. In this case, a message displaying that highlights are not available or a link to connect to a publisher of the digital work and requesting an electronic version may be presented.

This illustrative browser interface may also incorporate a graphic display showing the relative location of highlights within a representation of the work. This graphic display may be incorporate elements of the highlight user interface described next.

FIG. 17 depicts an illustrative HUI 1700. The HUI may be presented on a personal computer, e-book, media player, or other device. In this example, the HUI is shown while viewing text in an electronic book. A viewing window 1702 displays the portion of a digital work being viewed. In this case, the viewing window 1702 presents text from the electronic book being read. Also shown is a highlight display indicator (HDI) 1704 which depicts the digital work and the relative placement and importance of selected highlights within the digital work.

In this illustration of the HDI 1704, a beginning of the book is indicated by a left boundary 1706, while an end of the book is indicated by right boundary 1708, with the book being presented in a linear representation. Bands representing passages 1618, 1614, 1616, and 1620 may be distributed along the linear representation in the HDI 1704 according to their approximate location within a body of the book. Color of the bands and/or intensity of the color of the bands may be varied to indicate a correspondence to the metric pertaining to the highlight. For example, highlights with a high frequency of selection may be brilliant crimson, while highlights with a smaller number of highlights may be a dull green. A shape or icon associated with the highlight, for example, the bands in this illustration, may also be displayed with a size proportionate to the metric pertaining to the highlight. For example, highlights with a high frequency of selection may be presented as larger icons than highlights with a lower frequency. In this illustration, passage 1614 has the greatest number of highlights, and is indicated with a solid black band. Passage 1616 has fewer highlights, and is indicated with a medium gray band. Passage 1618 has still fewer highlights, and is indicated with a light gray band.

When the text viewing window 1702 displays text which is the subject of an aggregated highlight, the displayed text may be highlighted visually, such as with reverse video. Furthermore, the highlight which is currently being displayed such as passage 1614 in this illustration may be indicated in the HDI 1704. This indication may comprise an arrow 1710, changing the color of the band corresponding to the passage, blinking the band corresponding to the passage, etc.

A user may also navigate throughout the digital work using the HDI 1704. For example, a user may select a highlight from the HDI 1704, and the display window may be updated to show that portion of the digital work. The user may also use a movement scroll bar 1712 to move forward or backward through a digital work, and a zoom control scroll bar 1714 to increase or decrease the zoom of the HDI 1704 being presented, as described next in FIG. 18. A toggle highlights 1632 button may also be presented and operate as described previously.

Selection of which highlights to display in the HDI 1704 may proportional to a zoom level. For example, at a low zoom level only highlights having higher ranking metrics may be displayed. In this illustration, the HDI 1704 depicts the entire work, but only highlights having a highlight count greater than ten are shown at this zoom level.

FIG. 18 depicts the illustrative HUI of FIG. 17 of an electronic book while viewing another highlighted passage 1800. In this illustration, passage 1616 has been selected. The passage containing the highlighted text of passage 1616 is displayed in the display window 1702, with the highlighted text shown in reverse video. Indicator 1802 in the HDI 1704 shows that this is the current highlight being displayed.

As illustrated, a user has increased the setting of the zoom control scroll bar 1714. As a result of the zoom, the HDI 1704 now displays a beginning of the zoomed section indicated by a left boundary 1804, while an end of the zoomed section is indicated by right boundary 1806, while highlight 1802 showing the current highlight has increased in width to represent the same relative proportion of the zoom increase. As the zoom level is increased, highlights with ranking metrics pertaining to the highlight may be displayed which are lower than those displayed at lesser zoom levels. For example, the zoomed section showed here now displays additional highlights 1808. As the zoom level is decreased, display of a highlight in the HDI 1704 may be limited to highlights having higher ranking metrics pertaining to the highlight. As described above, the gray color of band 1616 on the HDI 1704, which is less intensive then the black band 1614 on the HDI 1704, may indicate that passage 1616 has been highlighted less frequently than passage 1614.

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on one or more computer-readable storage media.

The computer-readable storage media (CRSM) may be any available physical media that can be accessed by a computing device to implement the instructions stored thereon. CRSM may include, but is not limited to, random access memory (RAM), read-only memory (ROM), electrically erasable programmable read-only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

What is claimed is:

1. A method of generating aggregated highlights of a digital book from a plurality of highlights, the method comprising:
    obtaining raw highlight intervals of a digital book from a plurality of users; reconciling the raw highlight intervals across a plurality of versions of the digital book, the reconciling comprising synchronizing the versions of the digital book and consolidating the raw highlight intervals of the synchronized versions of the digital book, at least two of the plurality of versions of the digital book differing at least without regard to the raw highlight intervals;
    selecting aggregated highlight intervals based on the reconciled highlight intervals using a highlight selection rule, wherein the highlight selection rule comprises:
        computing an overlapping interval value for the reconciled highlight intervals by counting the intersections of at least partially overlapping highlights, or
        generating elementary highlight intervals from reconciled highlight intervals by placing start and end values of intervals on an interval list, sorting the interval list, removing duplicates from the interval list, and building elementary highlight intervals from the resulting sorted list;
    creating a public version of the selected aggregated highlight intervals;
    creating a purchase version of the selected aggregated highlight intervals, the purchase version differing from the public version and made available based at least in part on additional compensation with respect to the public version; and
    displaying the public version or the purchase version of selected aggregated highlight intervals to users.

2. The method of claim 1, further comprising an electronic book reader configured to display the public version or the purchase version of the selected aggregated highlight intervals.

3. The method of claim 1, wherein the highlight selection rule comprises:
    computing the overlapping interval value for the reconciled highlight intervals by counting the intersections of at least partially overlapping highlights;
    removing undesired highlight intervals from the reconciled highlight intervals to leave only desired highlight intervals, the removing comprising:
        removing overlapping highlight intervals having a length greater than a pre-determined maximum length;
        removing overlapping highlight intervals having a length less than a pre-determined minimum length;

removing overlapping highlight intervals having an overlapping interval value less than a pre-determined minimum overlapping interval value; and sorting the desired highlight intervals in descending order by the overlapping interval value by counting the intersections of overlapping highlights.

4. The method of claim 1, wherein the highlight selection rule comprises:

computing the overlapping interval value for the reconciled highlight intervals by counting the intersections of at least partially overlapping highlights;

removing undesired highlight intervals from the reconciled highlight intervals to leave only desired highlight intervals, the removing comprising:

removing overlapping highlight intervals having a length greater than a pre-determined maximum length;

removing overlapping highlight intervals having a length less than a pre-determined minimum length;

removing overlapping highlight intervals having an overlapping interval value less than a pre-determined minimum overlapping interval value;

sorting the desired highlight intervals in descending order by the overlapping interval value;

detecting an overlap between a first desired highlight interval and subsequent desired highlight intervals; and truncating overlapping subsequent desired highlight intervals to a nearest non-overlapping interval.

5. The method of claim 1, wherein the highlight selection rule comprises:

generating the elementary highlight intervals from the reconciled highlight intervals by placing start and end values of intervals on an interval list, sorting the interval list, removing duplicates from the interval list, and building the elementary highlight intervals from the resulting sorted list;

computing the overlapping interval value for the elementary highlight intervals by counting the intersections of at least partially overlapping highlights;

sorting the elementary highlight intervals in descending order by the overlapping interval value;

choosing elementary highlight intervals until a pre-determined highlight threshold is reached;

merging chosen elementary highlight intervals with adjacent intervals until the merged intervals meet or exceed a pre-determined minimum threshold; and discarding all unchosen highlight intervals.

6. The method of claim 1, wherein the highlight selection rule comprises:

generating the elementary highlight intervals from reconciled highlight intervals by placing start and end values of intervals on an interval list, sorting the interval list, removing duplicates from the interval list, and building elementary highlight intervals from the resulting sorted list;

computing the overlapping interval value for the elementary highlight intervals by counting the intersections of at least partially overlapping highlights;

comparing elementary highlight intervals against the reconciled highlight intervals and truncating reconciled highlight intervals overlapping the elementary highlight intervals, the truncating comprising:

selecting elementary highlight intervals with overlapping interval values less than a minimum overlapping interval value threshold;

truncating the reconciled highlight intervals by removing the overlapping selected elementary highlight intervals;

removing undesired highlight intervals to leave only desired highlight intervals, the removing comprising:

removing elementary highlight intervals that meet or exceed a minimum overlapping interval value threshold;

removing overlapping highlight intervals having a length greater than a pre-determined maximum length;

removing overlapping highlight intervals having a length less than a pre-determined minimum length; and sorting the desired highlight intervals in descending order by the overlapping interval value.

7. A method of generating highlight intervals of a digital work, the method comprising:

obtaining a plurality of highlight intervals in a digital work from a plurality of user devices;

selecting highlight intervals from the obtained plurality of highlight intervals using a highlight selection rule, wherein the highlight selection rule comprises:

computing an overlapping interval value for the raw highlight intervals by counting the intersections of at least partially overlapping highlights: or generating elementary highlight intervals from the raw highlight intervals by placing start and end values of all intervals on an interval list, sorting the interval list, removing duplicates from the interval list, and building elementary highlight intervals from the resulting sorted list;

creating a public version of the selected highlight intervals;

creating a purchase version of the selected highlight intervals to be offered for purchase, the purchase version differing from the public version and made available based at least in part on additional compensation with respect to the public version; and providing for display the public version or the purchase version of selected highlight intervals.

8. The method of claim 7, wherein the digital work comprises an electronic book.

9. The method of claim 7, wherein the selecting further comprises:

reconciling highlight intervals across a plurality of versions of the digital work, the reconciling comprising synchronizing the versions and consolidating the highlight intervals of the synchronized versions, at least two of the plurality of versions differing at least without regard to the highlights; and the selecting highlight intervals using the highlight selection rule selecting from the reconciled highlight intervals.

10. The method of claim 7, wherein the highlight selection rule comprises:

computing the overlapping interval value for the raw highlight intervals by counting the intersections of at least partially overlapping highlights;

removing undesired highlight intervals from the raw highlight intervals to leave only desired highlight intervals, the removing comprising:

removing overlapping highlight intervals having a length greater than a pre-determined maximum length;

removing overlapping highlight intervals having a length less than a pre-determined minimum length;

removing overlapping highlight intervals having an overlapping interval value less than a pre-determined minimum overlapping interval value; and sorting the desired highlight intervals in descending order by the overlapping interval value.

11. The method of claim 7, wherein the highlight selection rule comprises:

computing the overlapping interval value for the raw highlight intervals by counting the intersections of at least partially overlapping highlights;

removing undesired highlight intervals from the raw highlight intervals to leave only desired highlight intervals, the removing comprising:

removing overlapping highlight intervals having a length greater than a pre-determined maximum length;

removing overlapping highlight intervals having a length less than a pre-determined minimum length;

removing overlapping highlight intervals having an overlapping interval value less than a pre-determined minimum overlapping interval value, sorting the desired highlight intervals in descending order by the overlapping interval value;

detecting an overlap between a first desired highlight interval and subsequent desired highlight intervals; and truncating overlapping subsequent desired highlight intervals to a nearest non-overlapping interval.

12. The method of claim 7, wherein the highlight selection rule comprises:

generating the elementary highlight intervals from the raw highlight intervals by placing start and end values of all intervals on an interval list, sorting the interval list, removing duplicates from the interval list, and building the elementary highlight intervals from the resulting sorted list;

computing the overlapping interval value for the elementary highlight intervals by counting the intersections of at least partially overlapping highlights;

sorting the elementary highlight intervals in descending order by the overlapping interval value;

choosing elementary highlight intervals until a pre-determined highlight threshold is reached;

merging chosen elementary highlight intervals with adjacent intervals until the merged intervals meet or exceed a pre-determined minimum threshold; and discarding all unchosen highlight intervals.

13. The method of claim 7, wherein the highlight selection rule comprises:

generating the elementary highlight intervals from raw highlight intervals by placing start and end values of all intervals on an interval list, sorting the interval list, removing duplicates from the interval list, and building the elementary highlight intervals from the resulting sorted list;

computing the overlapping interval value for the elementary highlight intervals by counting the intersections of at least partially overlapping highlights;

comparing elementary highlight intervals against the raw highlight intervals and breaking or truncating raw highlight intervals overlapping the elementary highlight intervals, wherein the truncating comprises:

selecting elementary highlight intervals with overlapping interval values less than a minimum overlapping interval value threshold;

truncating the raw highlight intervals by removing the overlapping selected elementary highlight intervals;

removing undesired highlight intervals to leave only desired highlight intervals, the removing comprising:

removing overlapping highlight intervals having a length greater than a pre-determined maximum length;

removing overlapping highlight intervals having a length less than a pre-determined minimum length; and sorting the desired highlight intervals in descending order by the overlapping interval value.

14. The method of claim 7, wherein the digital work is stored in a digital locker.

15. The method of claim 7, wherein creating the public version of selected highlights comprises:

accessing the selected highlight intervals;

setting a public presentation threshold defining a maximum amount of the body of the work is displayable as public highlight intervals;

sorting selected highlight intervals by ranking, the ranking comprising highest ranked highlight intervals being most commonly highlighted of the selected highlight intervals to lowest ranked highlight intervals being least commonly highlighted of the selected highlight intervals; and generating the public version, the public version comprising highlight intervals up to the public presentation threshold.

16. The method of claim 15, wherein the public presentation threshold is less than or equal to two percent of a body of the digital work.

17. The method of claim 7, wherein creating the purchase version of selected highlights comprises:

accessing the selected highlight intervals;

setting a purchase presentation threshold defining a maximum amount of the body of the work is displayable as purchase highlight intervals;

sorting selected highlight intervals by ranking, the ranking comprising highest ranked highlight intervals being most commonly highlighted of the selected highlight intervals to lowest ranked highlight intervals being least commonly highlighted of the selected highlight intervals; and generating the purchase version, the purchase version comprising highlight intervals up to the purchase presentation threshold.

18. The method of claim 17, wherein the private presentation threshold is less than or equal to a percentage of a body of the digital work, the percentage being defined by a user.

19. One or more non-transitory computer-readable storage media storing instructions that when executed instruct a processor to perform acts comprising:

obtaining one or more highlights of a digital work from a plurality of user devices;

reconciling the obtained highlights across a plurality of versions of the digital work, at least two of the plurality of versions differing at least without regard to the highlights;

determining, from the reconciled highlights, commonly highlighted passages in the digital work;

generating selected highlights from the highlights, based on the determined commonly highlighted passages, wherein generating selected highlights comprises:

computing an overlapping interval value for the reconciled highlight intervals by counting the intersections of at least partially overlapping highlights; or generating elementary highlight intervals by placing start and end values of intervals on an interval list, sorting the interval list, removing duplicates from the interval list, and building elementary highlight intervals from the resulting sorted list creating a public version of the selected highlights;

creating a purchase version of the selected highlights, the purchase version differing from the public version and made available based at least in part on additional compensation with respect to the public version; and providing for display the public version or the purchase version of selected highlights.

20. The one or more non-transitory computer-readable storage media of claim 19, wherein the providing for display includes providing the selected highlights for display in a highlight user interface.

21. The one or more non-transitory computer-readable storage media of claim 19, wherein generating selected highlights comprises:

computing the overlapping interval value for the reconciled highlight intervals by counting the intersections of at least partially overlapping highlights;

removing undesired highlight intervals from the reconciled highlight intervals to leave only desired highlight intervals, the removing comprising:

removing overlapping highlight intervals having a length greater than a pre-determined maximum length;

removing overlapping highlight intervals having a length less than a pre-determined minimum length;

removing overlapping highlight intervals having an overlapping interval value less than a pre-determined minimum overlapping interval value; and sorting the desired highlight intervals in descending order by the overlapping interval value.

22. The one or more non-transitory computer-readable storage media of claim 19, wherein generating selected highlights comprises:

computing the overlapping interval value for the reconciled highlight intervals by counting the intersections of at least partially overlapping highlights;

removing undesired highlight intervals from the reconciled highlight intervals to leave only desired highlight intervals, the removing comprising:

removing overlapping highlight intervals having a length greater than a pre-determined maximum length;

removing overlapping highlight intervals having a length less than a pre-determined minimum length;

removing overlapping highlight intervals having an overlapping interval value less than a pre-determined minimum overlapping interval value;

sorting the desired highlight intervals in descending order by the overlapping interval value;

detecting an overlap between a first desired highlight interval and subsequent desired highlight intervals; and truncating overlapping subsequent desired highlight intervals to a nearest non-overlapping interval.

23. The one or more non-transitory computer-readable storage media of claim 19, wherein generating selected highlights comprises:

generating the elementary highlight intervals by placing start and end values of intervals on an interval list, sorting the interval list, removing duplicates from the interval list, and building elementary highlight intervals from the resulting sorted list;

computing the overlapping interval value for the elementary highlight intervals by counting the intersections of at least partially overlapping highlights;

sorting the elementary highlight intervals in descending order by the overlapping interval value;

choosing elementary highlight intervals until a pre-determined highlight threshold is reached;

merging chosen elementary highlight intervals with adjacent intervals until the merged intervals meet or exceed a pre-determined minimum threshold; and discarding all unchosen highlight intervals.

24. The one or more non-transitory computer-readable storage media of claim 19, wherein generating selected highlights comprises:

generating the elementary highlight intervals from reconciled highlight intervals by placing start and end values of intervals on an interval list, sorting the interval list, removing duplicates from the interval list, and building the elementary highlight intervals from the resulting sorted list;

computing the overlapping interval value for the elementary highlight intervals by counting the intersections of at least partially overlapping highlights;

comparing elementary highlight intervals against the reconciled highlight intervals and truncating reconciled highlight intervals overlapping the elementary highlight intervals, the truncating comprising:

selecting elementary highlight intervals with overlapping interval values less than a minimum overlapping interval value threshold;

truncating the reconciled highlight intervals by removing the overlapping selected elementary highlight intervals;

removing undesired highlight intervals to leave only desired highlight intervals, the removing comprising:

removing elementary highlight intervals that meet or exceed a minimum overlapping interval value threshold;

removing overlapping highlight intervals having a length greater than a pre-determined maximum length;

removing overlapping highlight intervals having a length less than a pre-determined minimum length; and sorting the desired highlight intervals in descending order by the overlapping interval value.

25. The one or more non-transitory computer-readable storage media of claim 19, wherein the reconciling highlights across the plurality of versions of the digital work comprises synchronizing the plurality of versions of the digital work with one another and tagging each highlight with the version or versions the highlight appears in.

26. A method of generating aggregated highlights of a book from a plurality of highlights, the method comprising:

obtaining raw highlight intervals of a book from a plurality of users from highlights in an digital work, or highlights scanned from a physical document, or both;

reconciling the raw highlight intervals across a plurality of versions of the book, the reconciling comprising synchronizing the versions of the book and consolidating the raw highlight intervals of the synchronized versions of the digital book, at least two of the plurality of versions differing at least without regard to the highlight intervals;

selecting aggregated highlight intervals based on the reconciled highlight intervals using a highlight selection rule, wherein the highlight selection rule comprises:

computing an overlapping interval value for the raw highlight intervals by counting the intersections of at least partially overlapping highlights: or generating elementary highlight intervals from the raw highlight intervals by placing start and end values of all intervals on an interval list, sorting the interval list, removing duplicates from the interval list, and building elementary highlight intervals from the resulting sorted list;

creating a public version of the selected aggregated highlight intervals;

creating a purchase version of the selected aggregated highlight intervals, the purchase version differing from the public version and made available based at least in part on additional compensation with respect to the public version; and displaying the public version or the purchase version of selected aggregated highlight intervals to users.

27. The method of claim 26, further comprising characterizing highlights scanned from a physical document by color of highlight, or underline, or both.

* * * * *